United States Patent
Shin et al.

(10) Patent No.: US 12,007,884 B2
(45) Date of Patent: Jun. 11, 2024

(54) METHOD OF ALLOCATING AND PROTECTING MEMORY IN COMPUTATIONAL STORAGE DEVICE, COMPUTATIONAL STORAGE DEVICE PERFORMING THE SAME AND METHOD OF OPERATING STORAGE SYSTEM USING THE SAME

(71) Applicant: SAMSUNG ELECTRONICS CO., LTD., Suwon-si (KR)

(72) Inventors: Jaeho Shin, Gwangmyeong-si (KR); Jeongho Lee, Gwacheon-si (KR); Younggeon Yoo, Seoul (KR); Hyeokjun Choe, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/895,260

(22) Filed: Aug. 25, 2022

(65) Prior Publication Data

US 2023/0143267 A1    May 11, 2023

(30) Foreign Application Priority Data

Nov. 8, 2021   (KR) .................... 10-2021-0152541
Jan. 11, 2022  (KR) .................... 10-2022-0003760

(51) Int. Cl.
*G06F 12/02*   (2006.01)
*G06F 12/14*   (2006.01)
*H04L 9/08*    (2006.01)

(52) U.S. Cl.
CPC ............. *G06F 12/02* (2013.01); *G06F 12/14* (2013.01); *H04L 9/0825* (2013.01)

(58) Field of Classification Search
CPC ....... G06F 12/02; G06F 12/14; H04L 9/0825; Y02D 10/00
USPC ......................................................... 711/170
See application file for complete search history.

(56) References Cited

U.S. PATENT DOCUMENTS

| | | |
|---|---|---|
| 7,702,922 B2 | 4/2010 | Hetzler |
| 8,218,770 B2 | 7/2012 | Arulambalam et al. |
| 8,578,127 B2 | 11/2013 | Thatcher et al. |
| 9,076,018 B2 | 7/2015 | Johnson |
| 9,602,283 B1 | 3/2017 | Chandra et al. |

(Continued)

FOREIGN PATENT DOCUMENTS

| | | |
|---|---|---|
| JP | 2021043708 A | 3/2021 |
| KR | 739105 A | 2/2003 |

(Continued)

*Primary Examiner* — Hua J Song
(74) *Attorney, Agent, or Firm* — Fish & Richardson P.C.

(57) ABSTRACT

In a method of allocating and protecting a memory in a computational storage device including a first computing engine and a buffer memory, a memory allocation request is received from a host device that is disposed outside the computational storage device. Based on the memory allocation request, a memory allocation operation in which a first memory region is generated in the buffer memory and a first key associated with the first memory region is generated is performed. A program execution request is received from the host device. Based on the program execution request, a program execution operation is performed in which a first program is executed by the first computing engine by accessing the first memory region based on an encryption or a decryption using the first key.

20 Claims, 31 Drawing Sheets

(56) References Cited

U.S. PATENT DOCUMENTS

| | | | |
|---|---|---|---|
| 9,767,044 B2 | 9/2017 | Chhabra et al. | |
| 9,830,278 B1* | 11/2017 | Harwood | H04L 63/061 |
| 9,933,974 B2 | 4/2018 | Han et al. | |
| 10,552,084 B2 | 2/2020 | Han et al. | |
| 10,592,436 B2 | 3/2020 | Leslie-Hurd et al. | |
| 11,216,206 B2 | 1/2022 | Han et al. | |
| 2016/0085695 A1 | 3/2016 | Leslie-Hurd et al. | |
| 2020/0244458 A1* | 7/2020 | Kanbe | G06F 3/0637 |
| 2020/0293676 A1* | 9/2020 | Hara | G06F 21/79 |
| 2020/0310990 A1 | 10/2020 | Leslie-Hurd et al. | |
| 2021/0073404 A1 | 3/2021 | Sakata et al. | |
| 2021/0157747 A1 | 5/2021 | Shin et al. | |

FOREIGN PATENT DOCUMENTS

| | | |
|---|---|---|
| KR | 20110089975 A | 8/2011 |
| KR | 20140080131 A | 6/2014 |
| KR | 20150102228 A | 9/2015 |
| KR | 2269010 | 6/2021 |
| KR | 20210064854 A | 6/2021 |

\* cited by examiner

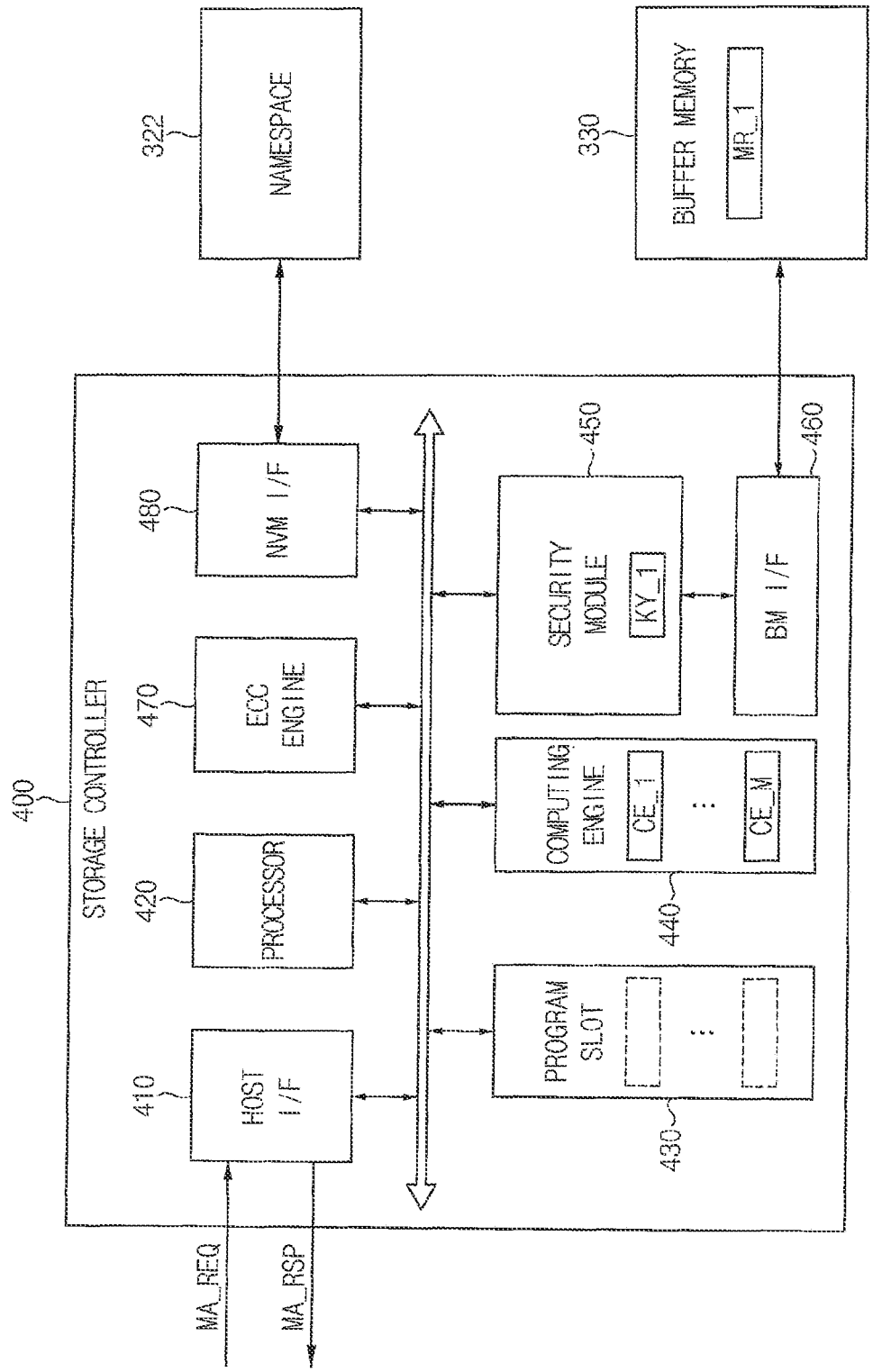

METHOD OF ALLOCATING AND PROTECTING MEMORY IN COMPUTATIONAL STORAGE DEVICE, COMPUTATIONAL STORAGE DEVICE PERFORMING THE SAME AND METHOD OF OPERATING STORAGE SYSTEM USING THE SAME

CROSS-REFERENCE TO RELATED APPLICATIONS

This application claims priority under 35 USC § 119 to Korean Patent Application No. 10-2021-0152541 filed on Nov. 8, 2021, and to Korean Patent Application No. 10-2022-0003760 filed on Jan. 11, 2022, in the Korean Intellectual Property Office (KIPO), the contents of which are herein incorporated by reference in their entirety.

BACKGROUND

1. Technical Field

Example embodiments relate generally to semiconductor integrated circuits and, more particularly, to methods of allocating and protecting memories in computational storage devices, computational storage devices performing the methods of allocating and protecting memories, and methods of operating storage systems including the computational storage devices.

2. Description of the Related Art

Certain types of data storage devices include one or more semiconductor memory devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Recently, various systems, e.g., a laptop computer, a car, an airplane, a drone, etc., have adopted the SSDs for data storage.

In a system including a storage device and a host device, instructions (or programs) and data are stored in the storage device and the instructions and the data should be transmitted from the storage device to the host device to perform data processing on the data based on the instructions. Thus, although a processing speed of the host device has been increased, a data transmission rate between the storage device and the host device may serve as a bottleneck for the performance improvement, and thus a throughput of the system may be limited. To address this issue, a computational storage device including a processor logic has been developed.

SUMMARY

At least one example embodiment of the present disclosure provides a method of efficiently allocating and protecting a memory that is included in a computational storage device and used in calculations performed by the computational storage device.

At least one example embodiment of the present disclosure provides a computational storage device that performs the method of allocating and protecting the memory and a method of operating a storage system that includes the computational storage device.

According to example embodiments, in a method of allocating and protecting a memory in a computational storage device including a first computing engine and a buffer memory, a memory allocation request is received from a host device that is disposed outside the computational storage device. Based on the memory allocation request, a memory allocation operation is performed in which a first memory region is generated in the buffer memory and a first key associated with the first memory region is generated. A program execution request is received from the host device. Based on the program execution request, a program execution operation is performed in which a first program is executed by the first computing engine by accessing the first memory region based on an encryption or a decryption using the first key.

According to example embodiments, a computational storage device includes a plurality of nonvolatile memories, a buffer memory, and a storage controller. The buffer memory temporarily stores data that is stored in or to be stored in the plurality of nonvolatile memories and is used to perform a data processing function. The storage controller controls an operation of the plurality of nonvolatile memories and an operation of the buffer memory. The storage controller includes a first computing engine used to perform the data processing function and a security module used to access the buffer memory. The storage controller receives a memory allocation request from a host device that is disposed outside the computational storage device, performs a memory allocation operation in which a first memory region is generated in the buffer memory and a first key associated with the first memory region is generated based on the memory allocation request, receives a program execution request from the host device, and performs a program execution operation in which a first program is executed by the first computing engine by accessing the first memory region based on an encryption or a decryption using the first key based on the program execution request.

According to example embodiments, in a method of operating a storage system including a host device and a computational storage device, the computational storage device includes a storage controller and a buffer memory. The storage controller performs a data processing function. A memory allocation request is transmitted, by the host device, to the storage controller. Based on the memory allocation request, a memory allocation operation is performed by the storage controller in which a first memory region is generated in the buffer memory and a first key associated with the first memory region is generated. A program load request is transmitted by the host device to the storage controller. Based on the program load request, a first program is loaded by the storage controller in a program slot. A program activation request is transmitted by the host device to the storage controller. Based on the program activation request, the first program is transmitted by the storage controller from the program slot to a first computing engine. A program execution request is transmitted by the host device to the storage controller. Based on the program execution request, a program execution operation is performed by the storage controller in which the first program is executed by the first computing engine by accessing the first memory region based on an encryption or a decryption using the first key. A memory deallocation request is transmitted by the host device to the storage controller. Based on the memory deallocation request, a memory deallocation operation is performed by the storage controller in which the first memory region is released in the buffer memory and the first key is deleted. When performing the program execution operation, first data which is a target of executing the first program is encrypted using the first key. The encrypted first data is stored in the first memory region. The encrypted first data is read from the first memory region. The first data is obtained by decrypting the encrypted first data using the first key. Second data, which is a result of executing the first program, is obtained by executing the first program based on the first data. The second data is encrypted using the first key. The encrypted second data is stored in the first memory region. The encrypted second data is read from the first memory region. The second data is obtained by decrypting the encrypted second data using the first key. The second data is transmitted by the storage controller to the host device.

In the method of allocating and protecting the memory in the computational storage device, the computational storage device, and the method of operating the storage system according to example embodiments, the computational storage device may include the security module that is used to access the buffer memory. Using the security module, the key corresponding to the memory region set by the memory allocation operation may be generated and stored, the memory region may be accessed based on the encryption or decryption using the generated key in the program execution operation, and the generated key may be deleted while releasing the setting of the memory region in the memory deallocation operation. Accordingly, an operation of initializing the memory region may be easily performed without an additional operation such as writing a pattern to the memory region, and the data security issue such as the leakage of data previously stored in the memory region may be prevented because an access to the data previously stored in the memory region becomes impossible by deleting the generated key. As a result, the computational storage device may have improved or enhanced operating performance and efficiency.

BRIEF DESCRIPTION OF THE DRAWINGS

Illustrative, non-limiting example embodiments will be more clearly understood from the following detailed description taken in conjunction with the accompanying drawings.

FIGS. 8A and 8B are diagrams for describing operations of receiving a memory allocation request and performing a memory allocation operation in FIG. 2.

DETAILED DESCRIPTION OF THE EMBODIMENTS

Figure 1:
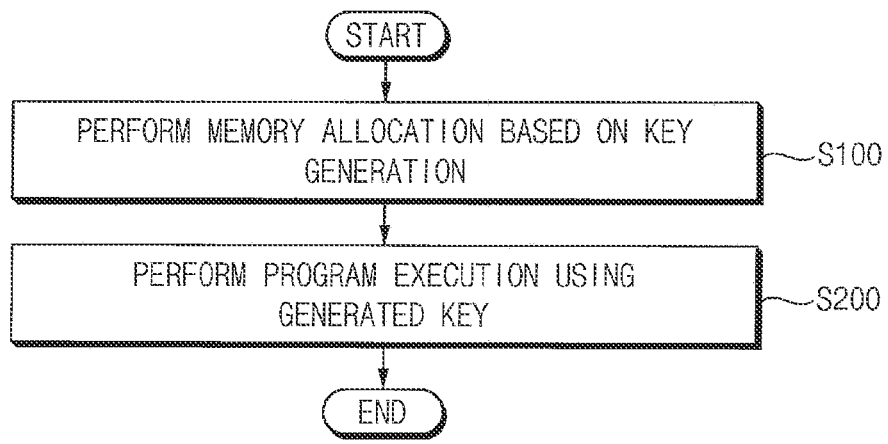
FIG. 1 is a flowchart illustrating a method of allocating and protecting a memory in a computational storage device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of allocating and protecting a memory in a computational storage device according to example embodiments.

Referring to FIG. 1, a method of allocating and protecting a memory according to example embodiments is performed by a computational storage device that includes a plurality of nonvolatile memories, a buffer memory, and a storage controller. The buffer memory is used to perform a data processing function. The storage controller includes at least one computing engine that is used to perform the data processing function and a security module that is used to access the buffer memory. Detailed configurations of the computational storage device and a storage system including the computational storage device will be described with reference to FIG. 3.

In the method of allocating and protecting the memory in the computational storage device according to example embodiments, a memory allocation based on key generation is performed (step S100). For example, the memory allocation may be performed on or for the buffer memory and a key (e.g., an encryption key or a security key) that is used to access the buffer memory may be generated together while the memory allocation is performed.

A program execution using the generated key is performed (step S200). For example, the program execution may represent an operation of performing the data processing function using the at least one computing engine and the buffer memory and the buffer memory may be accessed by performing an encryption and/or a decryption using the generated key while the data processing function is performed.

Figure 2:
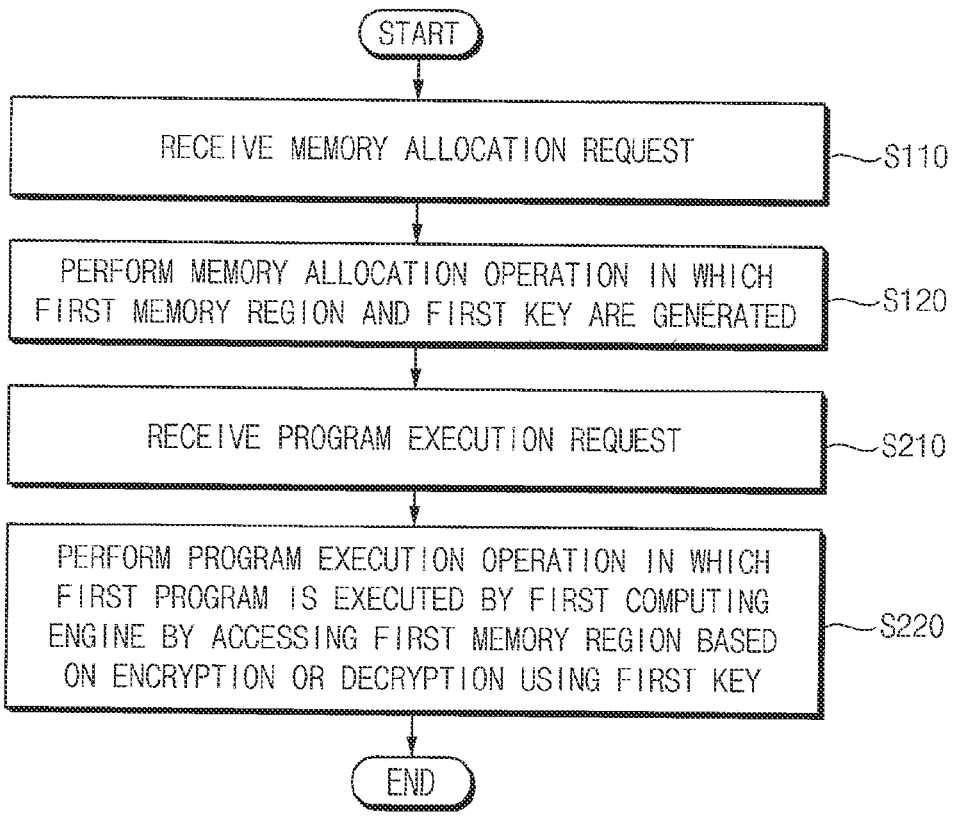
FIG. 2 is a flowchart illustrating an example of a method of allocating and protecting a memory in a computational storage device of FIG. 1.

FIG. 2 is a flowchart illustrating an example of a method of allocating and protecting a memory in a computational storage device of FIG. 1.

Referring to FIGS. 1 and 2, in step S100 the storage controller receives a memory allocation request from a host device that is disposed or located outside the computational storage device (step S110). Based on the memory allocation request, the storage controller performs a memory allocation operation in which a first memory region is generated in the buffer memory and a first key associated with or related to the first memory region is generated (step S120). For example, an operation of generating and storing the first key may be performed by the security module included in the storage controller. For example, although not illustrated in detail, an operation of transmitting an allocation success response to the host device may be additionally performed after the memory allocation operation is successfully completed in step S120.

In step S200, the storage controller receives a program execution request from the host device (step S210). Based on the program execution request, the storage controller performs a program execution operation in which a first program is executed by the first computing engine included in the storage controller by accessing the first memory region based on an encryption or a decryption using the first key (step S220). For example, the encryption or the decryption using the first key may be performed by the security module included in the storage controller. For example, although not illustrated in detail, an operation of transmitting a program execution success response to the host device may be additionally performed after the program execution operation is successfully completed in step S220.

Although FIG. 2 illustrates an example where one memory region and a corresponding one key are generated and one program is executed, example embodiments are not limited thereto. For example, a plurality of memory regions and a corresponding plurality of keys may be generated substantially simultaneously and/or sequentially and a plurality of programs may be executed substantially simultaneously and/or sequentially. In other words, steps S110 and S120 may be performed multiple times for different memory regions and steps S210 and S220 may be performed multiple times for different programs. In addition, memory allocation operations and program execution operations may be scheduled such that some of the memory allocation operations and some of the program execution operations are performed substantially simultaneously or in an arbitrary order.

Unlike a general storage device that only performs a data storage function, a computational storage device may perform both a data storage function and a data processing function together. To perform the data storage function and the data processing function together, the computational storage device may include a hardware element and/or a software program for performing the data processing function. For example, the hardware element may include a computing engine, an accelerator, a processing device, and/or or the like. For example, the software program may be implemented in the form of instruction codes or program routines and may be referred to as an application program.

In the computational storage device, a computing engine may access a buffer memory to execute a program. For example, a part or portion of the buffer memory may be allocated as a specific memory region for the computing engine and the program may be executed by an operation of accessing the specific memory region, e.g., by writing data associated with or related to the execution of the program to the specific memory region and/or by reading the data from the specific memory region. For example, an operation of initializing the specific memory region may be required while the specific memory region is allocated and the data security issue such as leakage of data previously stored in the specific memory region may occur if the operation of initializing the specific memory region is not performed. Conventionally, the specific memory region was initialized by writing a specific pattern (e.g., '0' pattern) to the specific memory region. However, there was a problem in that the initialization takes a relatively long time because the specific pattern should be written in the entire specific memory region, and there was a problem in that the computing performance is degraded or deteriorated by unnecessarily occupying a memory bandwidth.

In the method of allocating and protecting the memory in the computational storage device according to example embodiments, the computational storage device may include the security module that is used to access the buffer memory. Using the security module, the key corresponding to the memory region set by the memory allocation operation may be generated and stored, the memory region may be accessed based on the encryption or decryption using the generated key in the program execution operation, and the generated key may be deleted while releasing the setting of the memory region in the memory deallocation operation. Accordingly, an operation of initializing the memory region may be easily performed without an additional operation such as writing a pattern to the memory region, and the data security issue such as the leakage of data previously stored in the memory region may be prevented because an access to the data previously stored in the memory region becomes impossible by deleting the generated key. As a result, the computational storage device may have improved or enhanced operating performance and efficiency.

Figure 3:
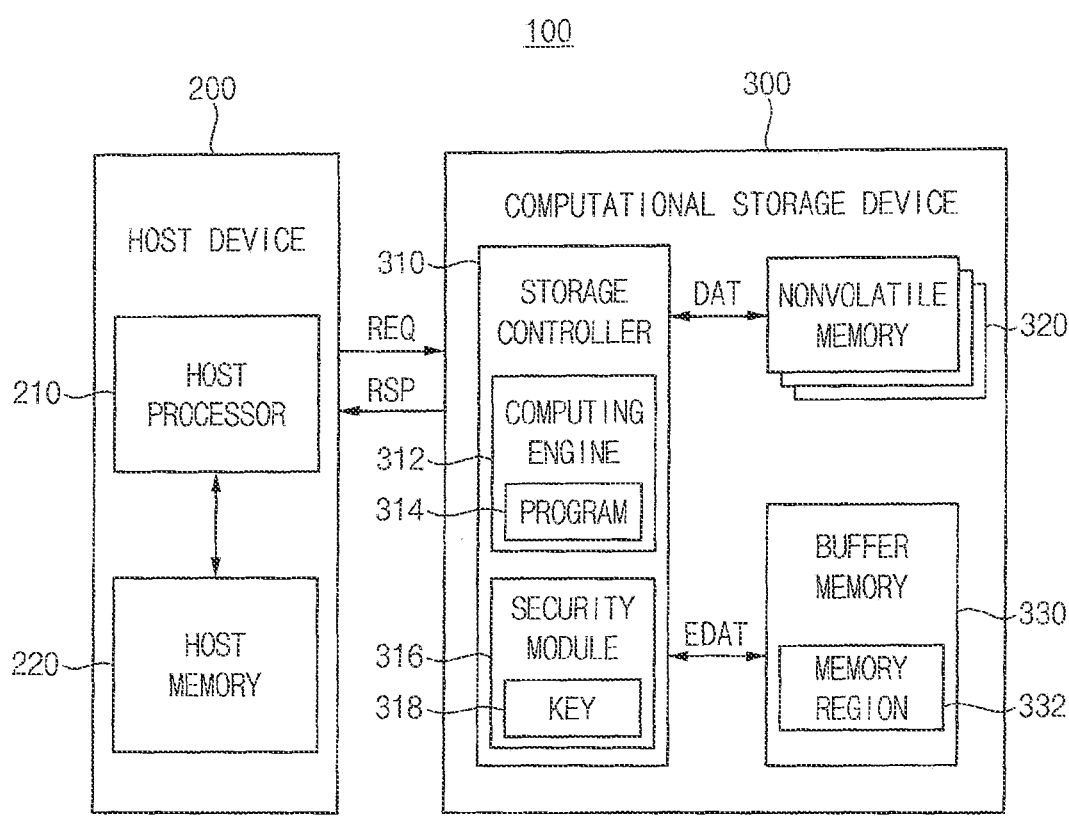
FIG. 3 is a block diagram illustrating a computational storage device and a storage system including the computational storage device according to example embodiments.

FIG. 3 is a block diagram illustrating a computational storage device and a storage system including the computational storage device according to example embodiments.

Referring to FIG. 3, a storage system 100 includes a host device 200 and a computational storage device 300.

The host device 200 controls overall operations of the storage system 100. The host device 200 may include a host processor 210 and a host memory 220.

The host processor 210 may control an operation of the host device 200. For example, the host processor 210 may execute an operating system (OS). For example, the operating system may include a file system for file management and a device driver for controlling peripheral devices including the computational storage device 300 at the operating system level. For example, the host processor 210 may include at least one of various processing units, e.g., a central processing unit (CPU), or the like.

The host memory 220 may store instructions and/or data that are executed and/or processed by the host processor 210. For example, the host memory 220 may include at least one of various volatile memories, e.g., a dynamic random access memory (DRAM), or the like.

The computational storage device 300 is accessed by the host device 200. The computational storage device 300 may include a storage controller 310, a plurality of nonvolatile memories 320, and a buffer memory 330.

The storage controller 310 may control an operation of the computational storage device 300. For example, the storage controller 310 may control operations (e.g., a data write operation and/or a data read operation) of the plurality of nonvolatile memories 320 based on a request (or host command) REQ and data that are received from the host device 200 and may transmit a response RSP representing a result of the request REQ to the host device 200.

The plurality of nonvolatile memories 320 may store a plurality of data DAT. For example, the plurality of nonvolatile memories 320 may store meta data, various user data, or the like.

In some example embodiments, each of the plurality of nonvolatile memories 320 may include a NAND flash memory. In other example embodiments, each of the plurality of nonvolatile memories 320 may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310 and may temporarily store data stored in or to be stored into the plurality of nonvolatile memories 320. For example, the buffer memory 330 may include at least one of various volatile memories, e.g., a static random access memory (SRAM), a DRAM, or the like. In some example embodiments, the buffer memory 330 may be included in the storage controller 310.

According to example embodiments, the storage controller 310 includes a computing engine 312 and a security module 316 and the buffer memory 330 includes a memory region 332.

The computational storage device 300 performs the method of allocating and protecting the memory according to example embodiments described with reference to FIGS. 1 and 2. For example, when or while a memory allocation operation is performed, the storage controller 310 may set the memory region 332 on a part of the buffer memory 330 and the security module 316 may generate and store a key 318 associated with the memory region 332. When or while a program execution operation is performed, the security module 316 may perform an encryption or decryption using the key 318 and the storage controller 310 and the computing engine 312 may access the memory region 332 based on the encryption or decryption using the key 318 to execute a program 314. For example, when the data DAT provided from the nonvolatile memory 320 is to be stored in the memory region 332, the security module 316 may generate encrypted data EDAT by encrypting the data DAT based on the key 318 and the encrypted data EDAT may be stored in the memory region 332.

In addition, the computational storage device 300 performs a method of allocating and protecting a memory according to example embodiments which will be described with reference to FIGS. 22 and 23. For example, when or while a memory deallocation operation is performed, the storage controller 310 may release the setting of the memory region 332 in the buffer memory 330 and the security module 316 may delete or remove the key 318 associated with the memory region 332.

Although not illustrated in detail, when the data DAT is written or stored into the nonvolatile memory 320 or the data DAT is read or retrieved from the nonvolatile memory 320, a command, an address, or the like, corresponding to the data DAT may be transmitted to the nonvolatile memory 320. Similarly, when the encrypted data EDAT is written or stored into the buffer memory 330 or the encrypted data EDAT is read or retrieved from the buffer memory 330, a command, an address, or the like, corresponding to the encrypted data EDAT may be transmitted to the buffer memory 330.

In some example embodiments, when the computational storage device 300 is implemented to perform the data processing function, the program 314 may be off-loaded from the host device 200 to the computational storage device 300 (e.g., to the storage controller 310 and the computing engine 312) and the computational storage device 300 (e.g., the storage controller 310 and the computing engine 312) may execute the program 314 that are off-loaded from the host device 200.

Off-loading of programs or computations represents the transfer of resource intensive computational tasks to a separate processor, such as a hardware accelerator, or an external platform, such as a cluster, grid, or a cloud. Off-loading to a co-processor may be used to accelerate applications including image rendering and mathematical calculations. Off-loading computations to an external platform over a network may provide computing power and overcome hardware limitations of a device, such as limited computational power, storage, and energy.

In some example embodiments, the computational storage device 300 and/or the storage controller 310 may operate based on nonvolatile memory express (NVMe) technical proposal (TP) 4091 protocol. The NVMe TP 4091 protocol is a standard being established by the Storage Networking Industry Association (SNIA) and is a standard being established for off-loading applications from a host device to a storage device. For example, when the NVMe TP 4091 protocol is applied, both calculations and commands may be transmitted together from the host device 200. For example, the memory region 332 may be referred to as a computational program memory (CPM) and may store parameter data, input data, output data, scratch data, or the like for executing the program 314.

In some example embodiments, the computational storage device 300 may be a solid state drive (SSD). In other example embodiments, the computational storage device 300 may be a universal flash storage (UFS), a multi-media card (MMC), or an embedded multi-media card (eMMC). In still other example embodiments, the computational storage device 300 may be one of a secure digital (SD) card, a micro SD card, a memory stick, a chip card, a universal serial bus (USB) card, a smart card, a compact flash (CF) card, or the like.

In some example embodiments, the computational storage device 300 may be connected to the host device 200 via a block accessible interface which may include, for example, a UFS, an eMMC, a serial advanced technology attachment (SATA) bus, a nonvolatile memory express (NVMe) bus, a serial attached SCSI (SAS) bus, or the like. The computational storage device 300 may use a block accessible address space corresponding to an access size of the plurality of nonvolatile memories 320 to provide the block accessible interface to the host device 200, for allowing the access by units of a memory block with respect to data stored in the plurality of nonvolatile memories 320.

In some example embodiments, the storage system 100 may be any computing system, such as a personal computer (PC), a server computer, a data center, a workstation, a digital television, a set-top box, a navigation system, etc. In other example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 4:
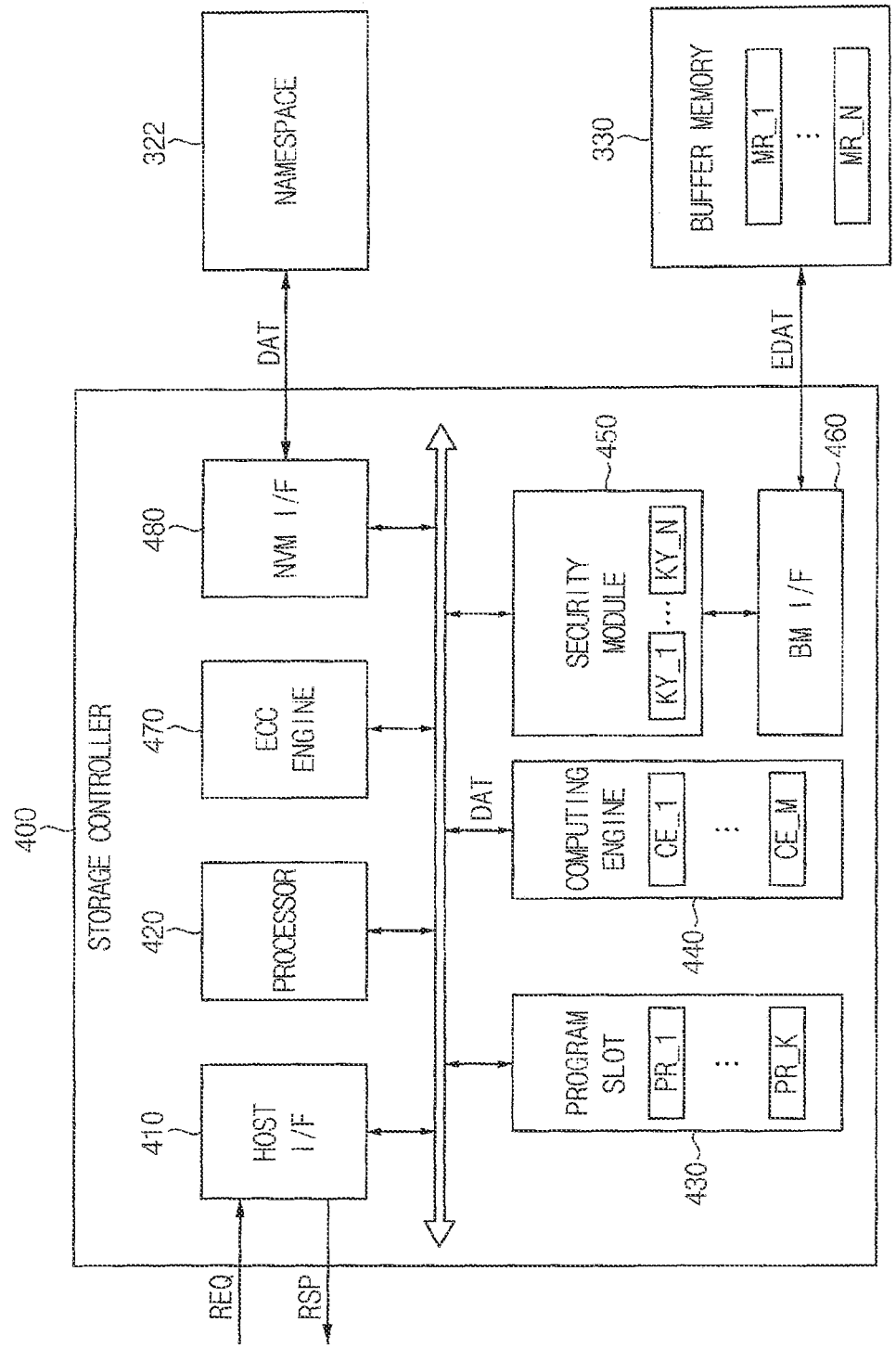
FIG. 4 is a block diagram illustrating an example of a storage controller and memories that are included in a computational storage device according to example embodiments.

FIG. 4 is a block diagram illustrating an example of a storage controller and memories that are included in a computational storage device according to example embodiments.

Referring to FIG. 4, a computational storage device (e.g., the computational storage device in FIG. 3) may include a storage controller 400, at least one namespace 322, and a buffer memory 330. The storage controller 400, the at least one namespace 322, and the buffer memory 330 may correspond to the storage controller 310, the plurality of nonvolatile memories 320 and the buffer memory 330 in FIG. 3, respectively.

The at least one namespace 322 may represent a logical storage space that is set on or for the plurality of nonvolatile memories 320. For example, the at least one namespace 322 may store the data DAT and may exchange the data DAT with the storage controller 400.

The buffer memory 330 may include a plurality of memory regions MR_1, . . . , MR_N that are allocated according to example embodiments, where N is a natural number greater than or equal to two. Each of the plurality of memory regions MR_1 to MR_N may be substantially the same as the memory region 332 in FIG. 3. For example, each of the plurality of memory regions MR_1 to MR_N may store the encrypted data EDAT and may exchange the encrypted data EDAT with the storage controller 400.

The storage controller 400 may include a host interface (I/F) 410, a processor 420, a program slot 430, a computing engine 440, a security module 450, a buffer memory (BM) interface 460, an error correction code (ECC) engine 470 and a nonvolatile memory (NVM) interface 480.

The host interface 410 may provide physical connections between a host device (e.g., the host device 200 in FIG. 3) and the computational storage device. The host interface 410 may provide an interface corresponding to a bus format of the host device for communication between the host device and the computational storage device. For example, the host interface 410 may receive the request REQ from the host device and may transmit the response RSP representing the result of the request REQ to the host device.

In some example embodiments, the host interface 410 may operate based on the NVMe TP 4091 protocol. In other words, the host interface 410 may support the NVMe TP 4091 protocol. A plurality of programs PR_1, . . . , PR_K may be off-loaded from the host device 410 based on the NVMe TP 4091 protocol, where K is a natural number greater than or equal to two.

The processor 420 may control an operation of the storage controller 400 in response to requests and/or calculations received via the host interface 410 from the host device. For example, the processor 420 may control an operation of the computational storage device and may control respective components by employing firmware for operating the computational storage device.

The program slot 430 may store the plurality of programs PR_1 to PR_K. Each of the plurality of programs PR_1 to PR_K may be substantially the same as the program 314 in FIG. 3. For example, the plurality of programs PR_1 to PR_K may include various operators such as a filter, a sum, a string concatenation, or the like. Although FIG. 4 illustrates that the program slot 430 is filled with the plurality of programs PR_1 to PR_K, example embodiments are not limited thereto and some or all of the program slot 430 may be empty as illustrated in FIG. 8B.

The computing engine 440 may execute the plurality of programs PR_1 to PR_K based on the data DAT and may generate the data DAT as a result of executing the plurality of programs PR_1 to PR_K. The computing engine 440 may include a plurality of computing engines CE_1, . . . , CE_M, where M is a natural number greater than or equal to two. Each of the plurality of computing engines CE_1 to CE_M may be substantially the same as the computing engine 312 in FIG. 3 and may execute one or more programs. For example, the plurality of computing engines CE_1 to CE_M may include various computational resources and/or accelerators such as a CPU, a neural processing unit (NPU), a graphic processing unit (GPU), a digital signal processor (DSP), an image signal processor (ISP), or the like.

The security module 450 may generate and store a plurality of keys KY_1, . . . , KY_N that are different from each other and correspond to the plurality of memory regions MR_1 to MR_N, respectively. The security module 450 may be substantially the same as the security module 316 in FIG. 3, and each of the plurality of keys KY_1 to KY_N may be substantially the same as the key 318 in FIG. 3. For example, the key KY_1 may correspond to the memory region MR_1 and may be used to access the memory region MR_1. A configuration of the security module 450 will be described with reference to FIG. 5.

The buffer memory interface 460 may exchange the encrypted data EDAT with the buffer memory 330 (e.g., with the plurality of memory regions MR_1 to MR_N). For example, the encrypted data EDAT may be generated by the security module 450 using the plurality of keys KY_1 to KY_N.

The ECC engine 470 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using the above-described codes or other error correction codes.

The nonvolatile memory interface 480 may exchange the data DAT with the at least one namespace 322. The nonvolatile memory interface 480 may transfer the data DAT to the at least one namespace 322 or may receive the data DAT read from the at least one namespace 322. For example, the nonvolatile memory interface 480 may be configured to comply with a standard protocol, such as Toggle or open NAND flash interface (ONFI).

Figure 5:
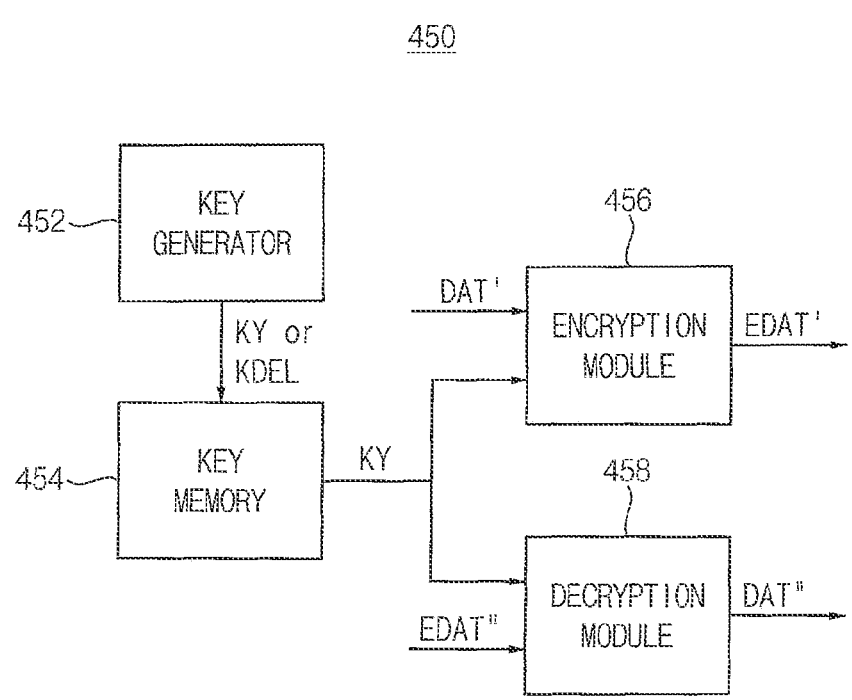
FIG. 5 is a block diagram illustrating an example of a security module included in a storage controller included in a computational storage device according to example embodiments.

FIG. 5 is a block diagram illustrating an example of a security module included in a storage controller included in a computational storage device according to example embodiments.

Referring to FIGS. 4 and 5, the security module 450 may include a key generator 452, a key memory 454, an encryption module 456 and a decryption module 458.

The key generator 452 may generate a key KY or a key deletion signal KDEL. For example, the key generator 452 may generate the key KY corresponding to the memory region based on a memory allocation request (e.g., a memory allocation request MA_REQ in FIG. 8) and may generate the key deletion signal KDEL for deleting the key KY from the key memory 454 based on a memory deallocation request (e.g., a memory deallocation request MDA_REQ of FIG. 24).

The key memory 454 may store a memory region identification (ID) and the key KY that correspond to the memory region and may provide the key KY to the encryption module 456 and/or the decryption module 458 based on an access request (e.g., a request RI_REQ in FIG. 14, a request P_REQ in FIG. 16 and/or a request RO_REQ in FIG. 18) to the corresponding memory region.

The encryption module 456 may receive data DAT' transmitted from the namespace 322 and/or the computing engine 440, may receive the key KY provided from the key memory 454, and may generate encrypted data EDAT' by encrypting the data DAT' using the key KY. The encrypted data EDAT' may be transmitted to the buffer memory 330 and may be stored in the corresponding memory region.

The decryption module 458 may receive encrypted data EDAT" transmitted from the buffer memory 330 (e.g., from the corresponding memory region) and may generate data DAT" by decrypting the encrypted data EDAT" using the key KY that is the same as the key KY used to encrypt the data DAT'. The data DAT" may be transmitted to the computing engine 440 and/or the host device.

In some example embodiments, the security module 450 may be implemented in the form of an advanced encryption standard (AES) engine. The AES engine may perform at least one of an encryption operation and a decryption operation on data using a symmetric-key algorithm.

Although FIG. 5 illustrates an example where the encryption module 456 and the decryption module 458 are implemented as separate modules, example embodiments are not limited thereto and the encryption module 456 and the decryption module 458 may be implemented as one module capable of performing both encryption and decryption operations.

Figure 6:
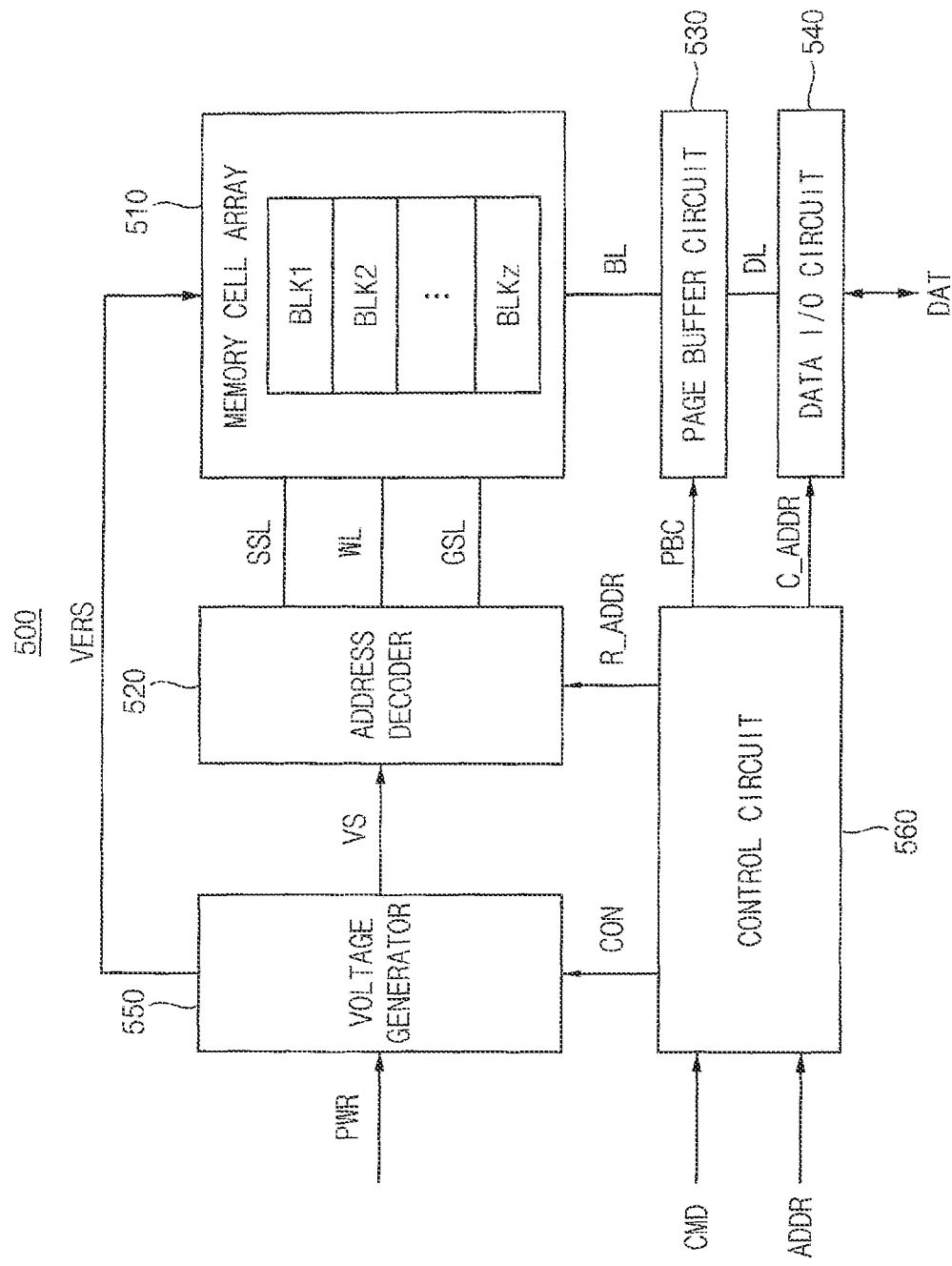
FIG. 6 is a block diagram illustrating an example of a nonvolatile memory included in a computational storage device according to example embodiments.

FIG. 6 is a block diagram illustrating an example of a nonvolatile memory included in a computational storage device according to example embodiments.

Referring to FIG. 6, a nonvolatile memory 500 includes a memory cell array 510, an address decoder 520, a page buffer circuit 530, a data input/output (I/O) circuit 540, a voltage generator 550, and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from outside (e.g., from the storage controller 310 in FIG. 3) and controls erasure, programming, and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and a data recovery read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL, and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line based on the row address R_ADDR.

The voltage generator 550 may generate voltages VS that are required for an operation of the nonvolatile memory 500 based on power PWR and the control signals CON. The voltages VS may be applied to the plurality of string selection lines SSL, the plurality of wordlines WL, and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500 based on the column address C_ADDR.

Although the nonvolatile memory according to example embodiments is described based on a NAND flash memory, the nonvolatile memory according to example embodiments may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 7A:
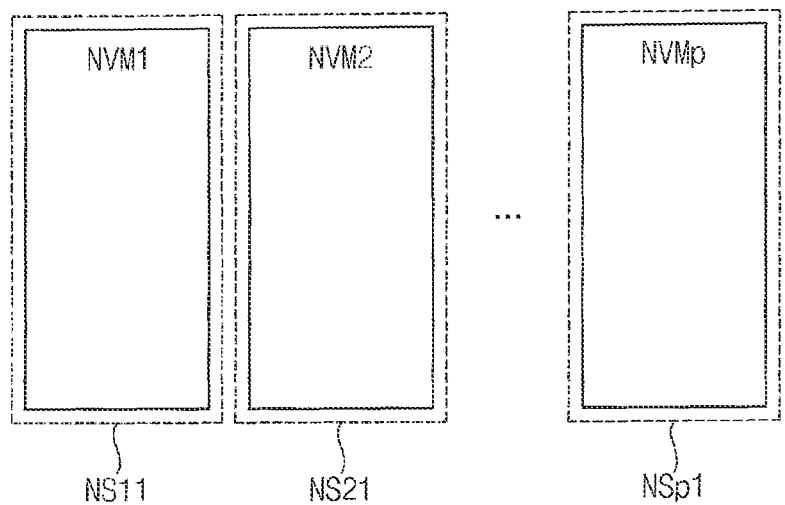
FIGS. 7A, 7B and 7C are diagrams for describing namespaces set on nonvolatile memories included in a computational storage device according to example embodiments.
Figure 7B:
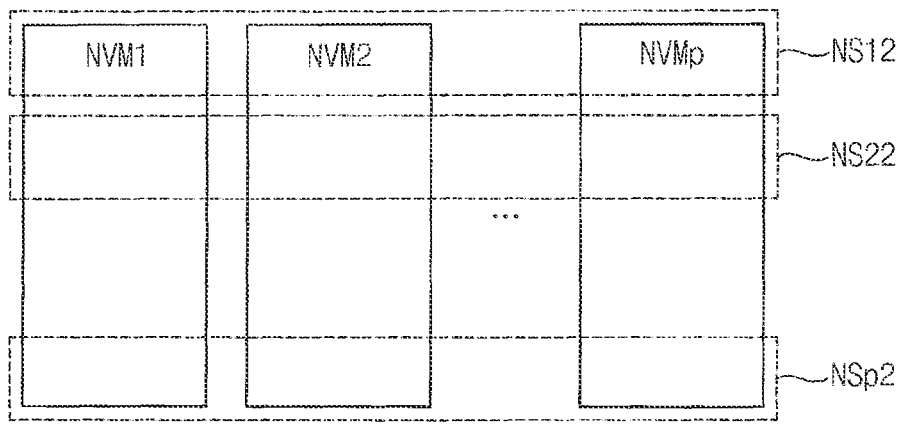
Figure 7C:
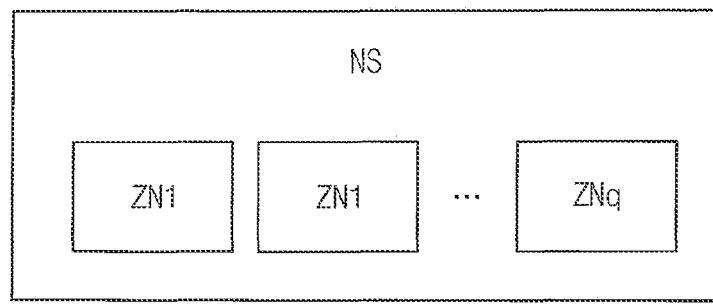

FIGS. 7A, 7B and 7C are diagrams for describing namespaces set on nonvolatile memories included in a computational storage device according to example embodiments.

The computational storage device according to example embodiments may operate based on a nonvolatile memory express (NVMe) protocol and may support a namespace function and/or a zoned namespace (ZNS) function. The NVMe may be an interface of a register level that performs communication between a storage device, such as a solid state drive (SSD), and host software. The NVMe may be based on a conventional peripheral component interconnect express (PCIe) bus (or compute express link (CXL) bus) and may be an interface designed or, alternatively, optimized for an SSD. When the namespace function is used, a storage device implemented with one physical device may be partitioned into a plurality of logical devices (e.g., a plurality of namespaces) and data may be managed based on the plurality of namespaces. When the zoned namespace function is used, one namespace may be additionally partitioned into a plurality of zones and data may be managed based on the plurality of namespaces and the plurality of zones. All of the plurality of namespaces and the plurality of zones may be physically included in the same storage device, and each namespace and each zone may be used as a separate storage space. For example, CXL protocol is an open standard for high-speed CPU-to-device and CPU-to-memory connections designed for high performance data center computers. The CXL protocol is built on PCIe physical and electrical interface with protocols in three areas: I/O, memory, and cache coherence.

Referring to FIG. 7A, an example of generating and setting a plurality of namespaces NS11, NS21, . . . , NSp1 on a plurality of nonvolatile memories NVM1, NVM2, . . . , NVMp is illustrated, where p is a natural number greater than or equal to two. For example, the plurality of nonvolatile memories NVM1 to NVMp may be included in one storage device and, thus, the plurality of namespaces NS11 to NSp1 may also be included in one storage device. One of the plurality of namespaces NS11 to NSp1 may correspond to the namespace 322 in FIG. 4.

In an example of FIG. 7A, one namespace may be generated and set on one nonvolatile memory. For example, the namespace NS11 may be generated and set on the entire region of the nonvolatile memory NVM1.

Referring to FIG. 7B, another example of generating and setting a plurality of namespaces NS12, NS22, . . . , NSp2 on a plurality of nonvolatile memories NVM1, NVM2, . . . , NVMp is illustrated. The descriptions repeated with FIG. 7A will be omitted.

In an example of FIG. 7B, one namespace may be generated and set on all of the plurality of nonvolatile memories NVM1 to NVMp. For example, the namespace NS12 may be generated and set on some regions of all of the plurality of nonvolatile memories NVM1 to NVMp.

Although not illustrated in FIGS. 7A and 7B, the operation of generating and setting the namespaces may be variously implemented according to example embodiments. For example, the capacities of the namespaces NS11 to NSp1 and NS12 to NSp2 may be substantially the same as or different from each other. For example, the number of namespaces NS11 to NSp1 and NS12 to NSp2 and the number of nonvolatile memories NVM1 to NVMp may be substantially the same as or different from each other.

Referring to FIG. 7C, an example of generating and setting a plurality of zones ZN1, ZN2, . . . , ZNq on one namespace NS is illustrated, where q is a natural number greater than or equal to two. The namespace NS may correspond to one of the namespaces NS11 to NSp1 in FIG. 7A and the namespaces NS12 to NSp2 in FIG. 7B.

In some example embodiments, the operation of generating and setting the namespaces and/or the zones may be performed in advance at an initial operation time. In other example embodiments, the operation of generating and setting the namespaces and/or the zones may be performed in real-time or during runtime.

Hereinafter, example embodiments will be described based the first memory region MR_1 being allocated to the buffer memory 330 and the first computing engine CE_1 executing the first program PR_1 using the first memory region MR_1.

Figure 8A:
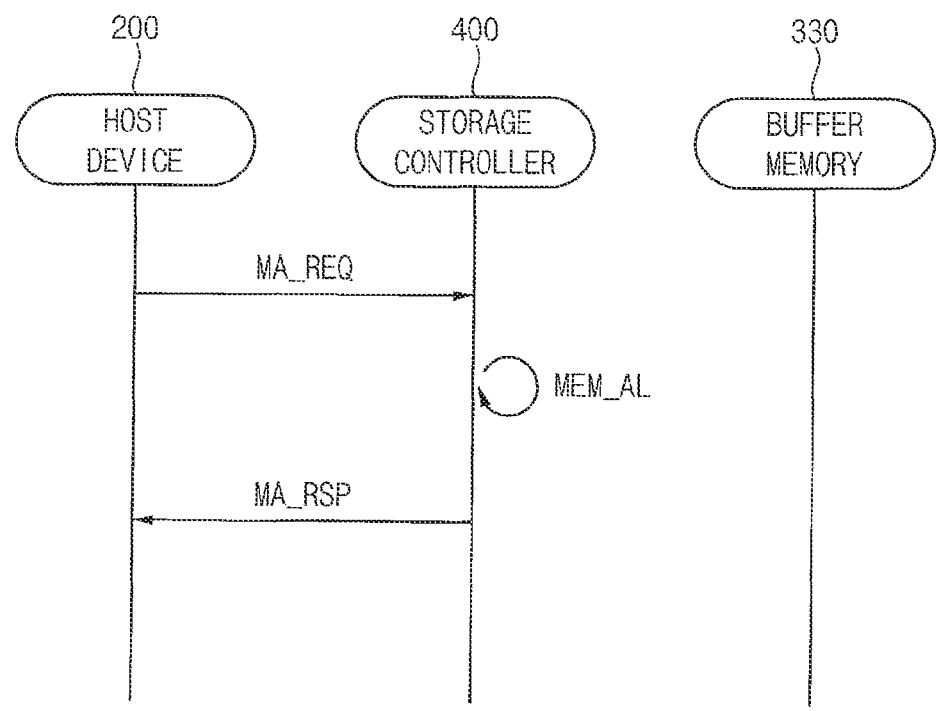

FIGS. 8A and 8B are diagrams for describing operations of receiving a memory allocation request and performing a memory allocation operation in FIG. 2.

Referring to FIGS. 2, 8A, and 8B at an initial operation time, the program slot 430 may be empty and the computing engines CE_1 to CE_M may not execute and/or activate a program.

In step S110, the host device 200 may transmit a memory allocation request MA_REQ to the storage controller 400. For example, the memory allocation request MA_REQ may include address information (e.g., address information ADDR_1 in FIG. 10) of the first memory region MR_1.

In step S120, the storage controller 400 may perform a memory allocation operation MEM_AL based on the memory allocation request MA_REQ. For example, the storage controller 400 may set the first memory region MR_1 in the buffer memory 330 and the security module 450 may generate and store the first key KY_1 associated with the first memory region MR_1.

After the memory allocation operation MEM_AL is successfully completed, the storage controller 400 may transmit an allocation success response MA_RSP to the host device 200. In the computational storage device according to example embodiments, an operation of initializing the first memory region MR_1 may be easily performed without an additional operation such as writing a pattern to the first memory region MR_1. Thus, after the memory allocation request MA_REQ is received, the allocation success response MA_RSP may be transmitted to the host device 200 without receiving an additional data write request and additional write data from the host device 200.

Figure 9:
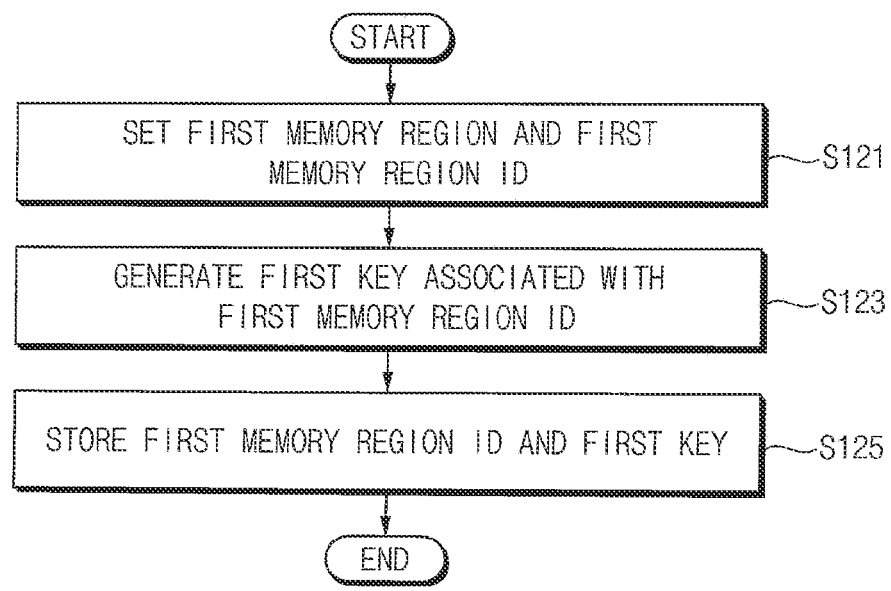
FIG. 9 is a flowchart illustrating an example of performing a memory allocation operation in FIG. 2.
Figure 10:
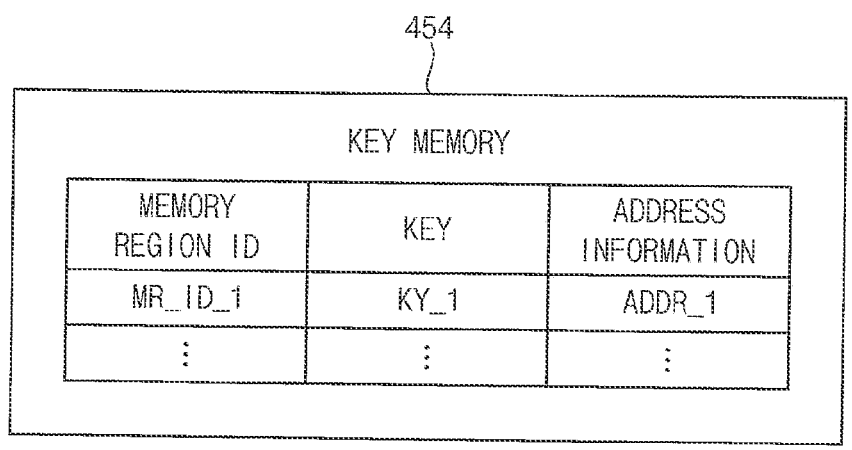
FIG. 10 is a diagram for describing an operation of FIG. 9.

FIG. 9 is a flowchart illustrating an example of performing a memory allocation operation in FIG. 2. FIG. 10 is a diagram for describing an operation of FIG. 9.

Referring to FIGS. 2, 8B, 9 and 10, in step S120, the first memory region MR_1 may be set on a part of the buffer memory 330 and a first memory region ID MR_ID_1 corresponding to the first memory region MR_1 may be set (step S121). For example, the first memory region ID MR_ID_1 may be included in the memory allocation request MA_REQ transmitted from the host device 200 or may be set by the storage controller 400 by itself.

A first key KY_1 associated with the first memory region ID MR_ID_1 may be generated (step S123). For example, the key generator 452 included in the security module 450 may generate the first key KY_1.

The first memory region ID MR_ID_1 and the first key KY_1 may be stored (step S125). For example, the key memory 454 included in the security module 450 may store a relationship (or correspondence) among the first memory region ID MR_ID_1, the first key KY_1, and first address information ADDR_1 associated with the first memory region MR_1 in the form of a table. For example, the first address information ADDR_1 may be included in the memory allocation request MA_REQ transmitted from the host device 200. For example, the first address information ADDR_1 may represent a specific address value and/or range, and may include, e.g., a start address and an end address of the first memory region MR_1.

Figure 11A:
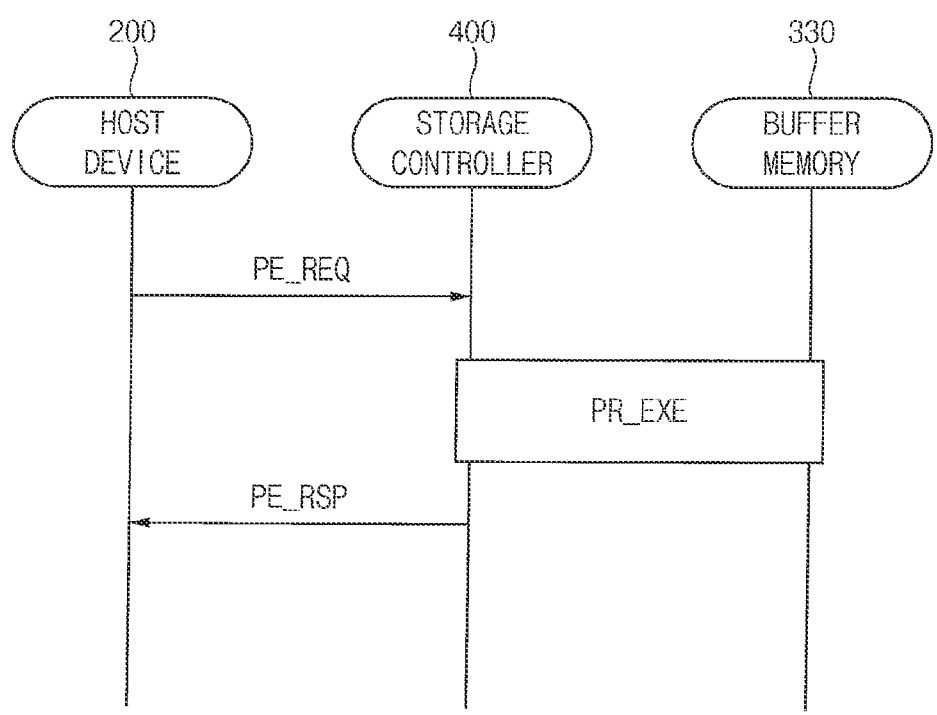
FIGS. 11A and 11B are diagrams for describing operations of receiving a program execution request and performing a program execution operation in FIG. 2.
Figure 11B:
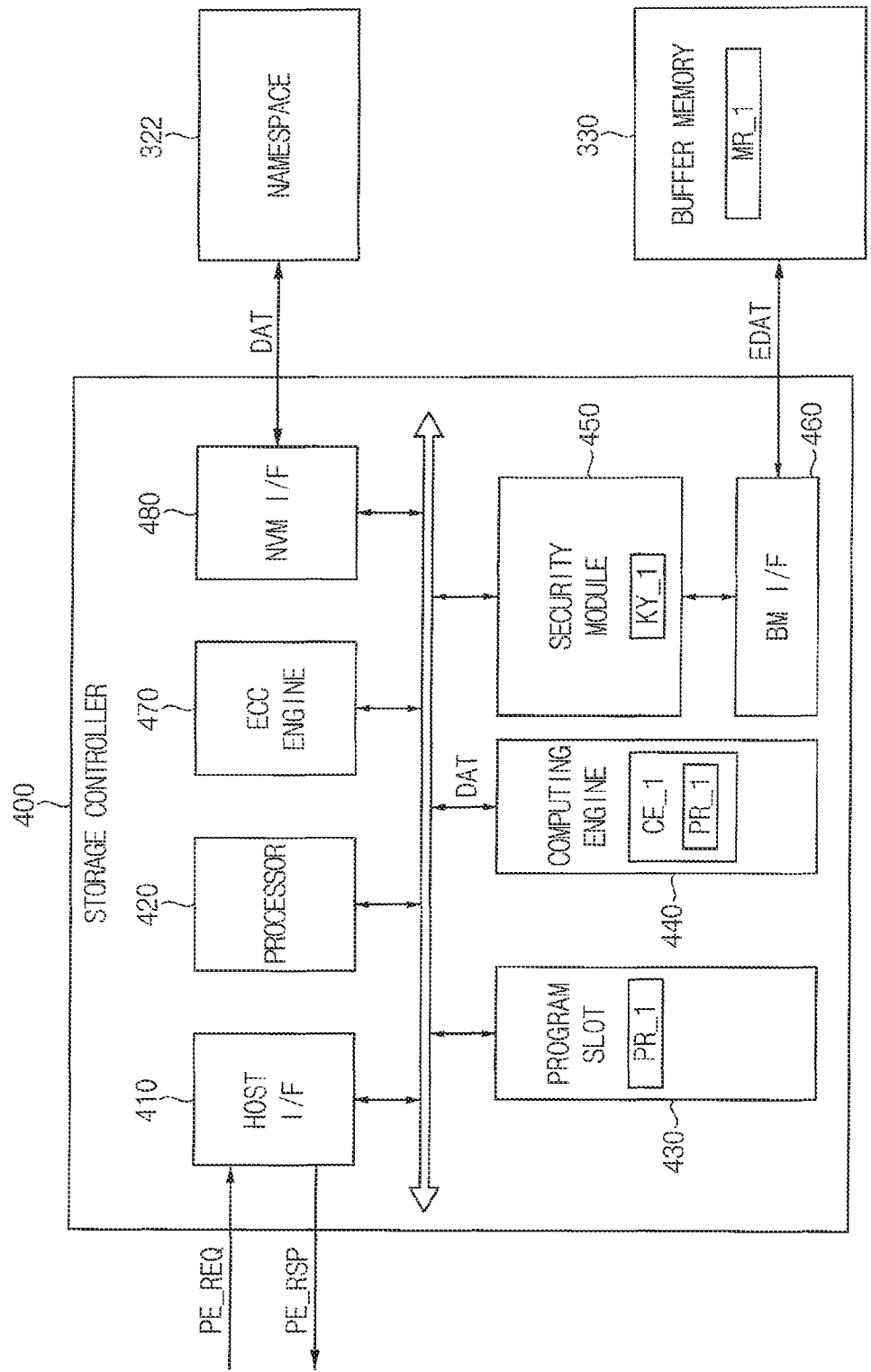

FIGS. 11A and 11B are diagrams for describing operations of receiving a program execution request and performing a program execution operation in FIG. 2.

Referring to FIGS. 2, 11A and 11B, before a program execution request PE_REQ is transmitted, the first program PR_1 may be loaded and stored in the program slot 430 and the first program PR_1 may be transmitted to and activated by the first computing engine CE_1. Such program load and activation operations will be described with reference to FIGS. 20 and 21.

In step S210, the host device 200 may transmit the program execution request PE_REQ to the storage controller 400. For example, the program execution request PE_REQ may include a first program ID associated with the first program PR_1, an access request to the first memory region MR_1, the first memory region ID MR_ID_1, an address, or the like.

In step S220, the storage controller 400 and the buffer memory 330 may perform a program execution operation PR_EXE based on the program execution request PE_REQ. For example, the first computing engine CE_1 may execute the first program PR_1 by encrypting the data DAT using the first key KY_1 and/or decrypting the encrypted data EDAT to access the first memory region MR_1.

After the program execution operation PR_EXE is successfully completed, the storage controller 400 may transmit a program execution success response PE_RSP to the host device 200.

Figure 12:
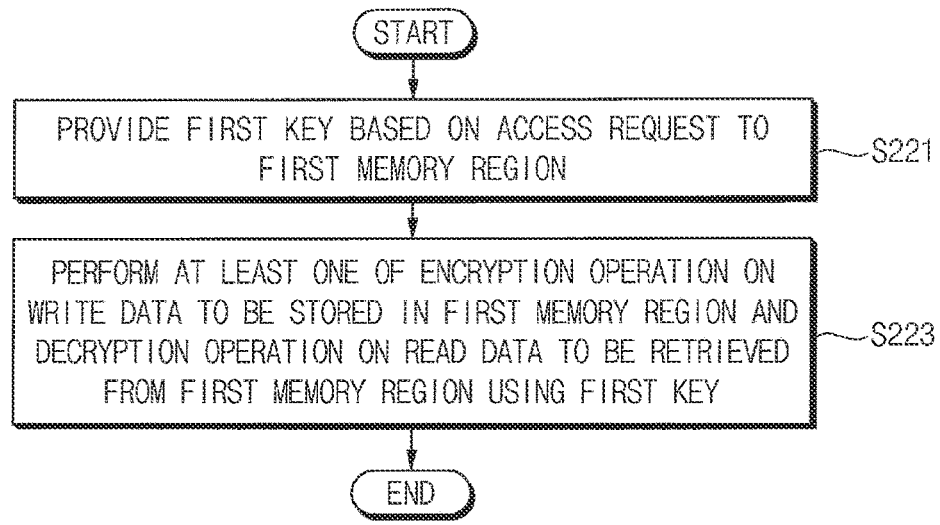
FIG. 12 is a flowchart illustrating an example of performing a program execution operation in FIG. 2.

FIG. 12 is a flowchart illustrating an example of performing a program execution operation in FIG. 2.

Referring to FIGS. 2, 11B and 12, in step S220, the first key KY_1 may be provided based on an access request to the first memory region MR_1 (step S221). For example, the access request to the first memory region MR_1 may be included in the program execution request PE_REQ transmitted from the host device 200. For example, based on a write request and/or read request to a specific address of the first memory region MR_1, the key memory 454 included in the security module 450 may provide the first key KY_1 to the encryption module 456 and/or the decryption module 458 included in the security module 450.

At least one of an encryption operation on write data to be stored in the first memory region MR_1 and a decryption operation on read data to be retrieved from the first memory region MR_1 may be performed using the first key KY_1 (step S223). For example, the encryption module 456 and the decryption module 458 included in the security module 450 may perform the encryption operation and the decryption operation, respectively.

Figure 13:
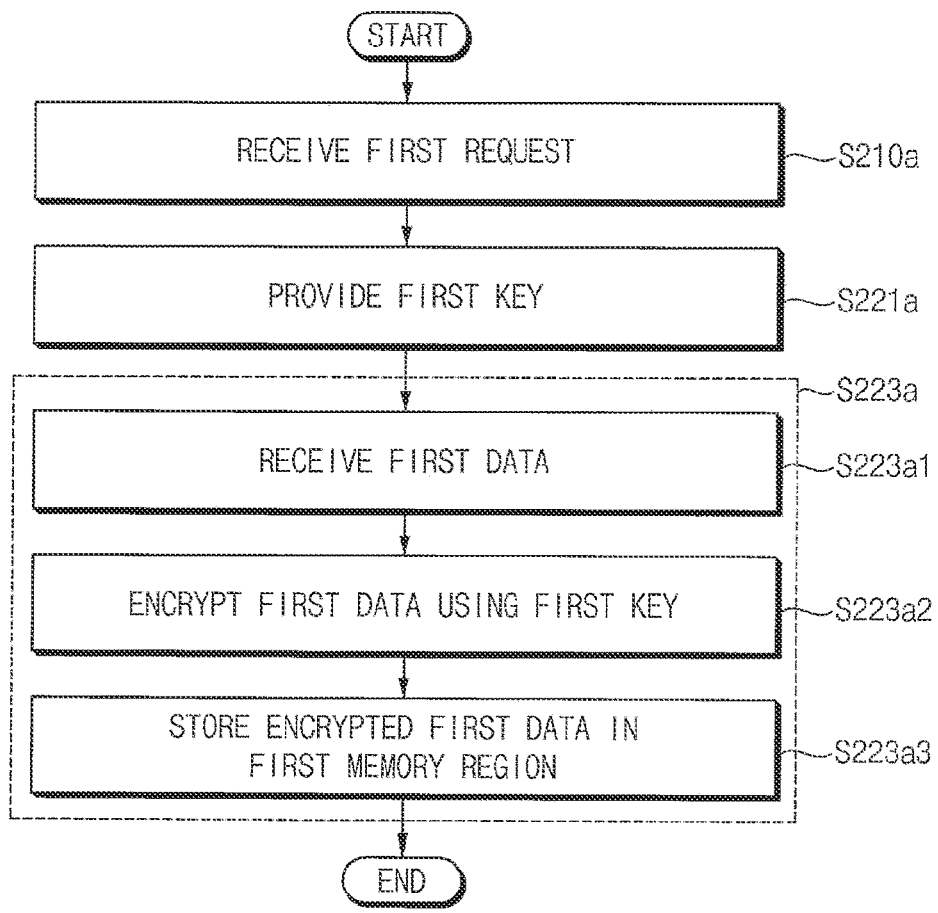
FIG. 13 is a flowchart illustrating an example of receiving a program execution request and performing a program execution operation in FIG. 2.
Figure 14:
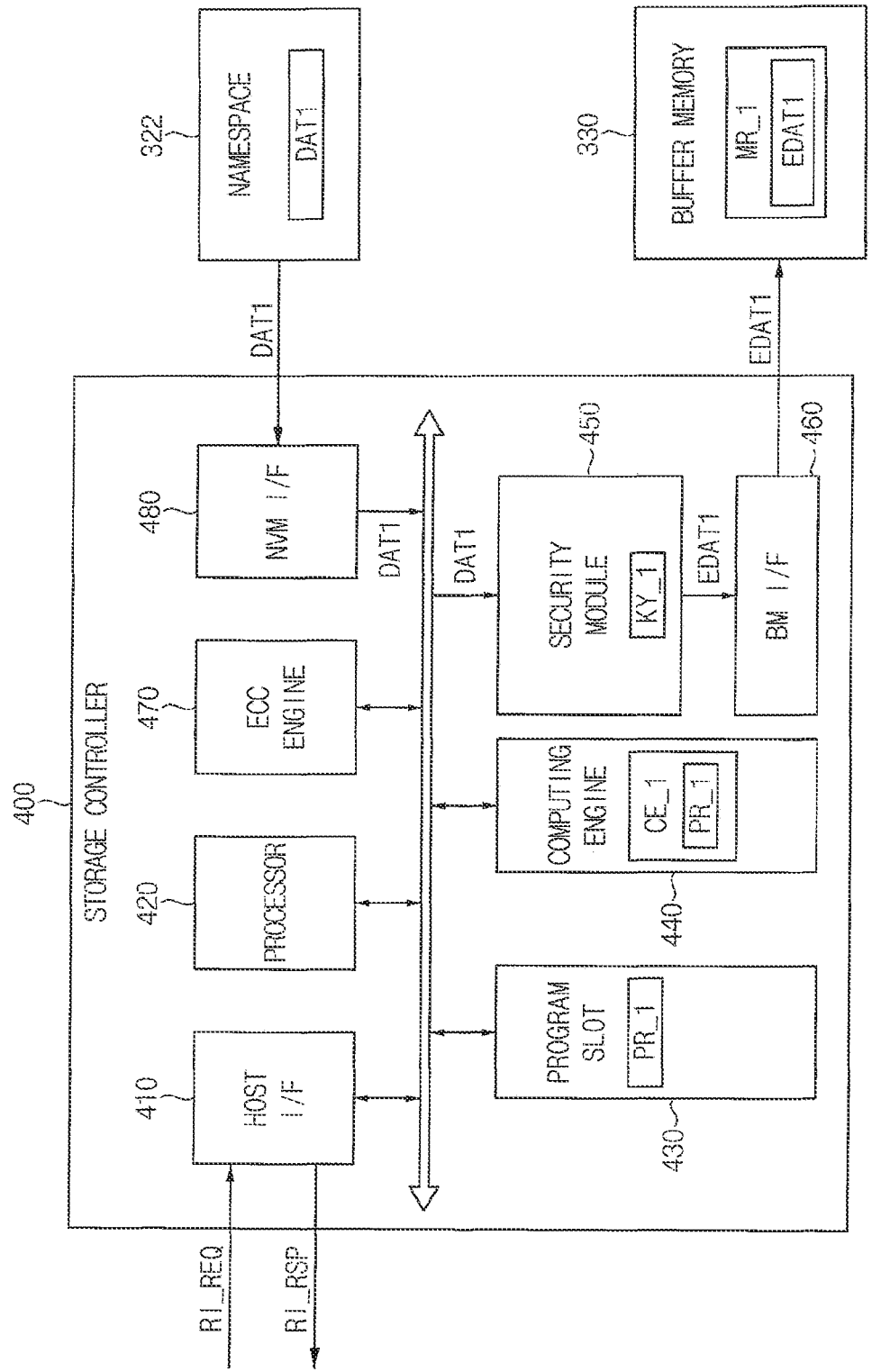
FIG. 14 is a diagram for describing an operation of FIG. 13.

FIG. 13 is a flowchart illustrating an example of receiving a program execution request and performing a program execution operation in FIG. 2. FIG. 14 is a diagram for describing an operation of FIG. 13.

Referring to FIGS. 2, 12, 13 and 14, in step S210, a first request RI_REQ, which is included in the program execution request PE_REQ and included in the access request to the first memory region MR_1, may be received (step S210a). For example, the first request RI_REQ may be a request for storing first data DAT1, which is a target of executing the first program PR_1, in the first memory region MR_1. The first request RI_REQ may be referred to as an input data read request. For example, the first data DAT1 may be stored in the namespace 322 and the first data DAT1 may be copied from the namespace 322 to the first memory region MR_1. For example, the first request RI_REQ may include a first read address that is required to read the first data DAT1 from the namespace 322, a first write address that is required to write encrypted first data EDAT1 corresponding to the first data DAT1 to the first memory region MR_1, or the like.

In step S220, the key memory 454 may provide the first key KY_1 based on the first request RI_REQ (step S221a), and an encryption operation on the first data DAT1 may be performed using the first key KY_1 (step S223a). For example, the first key KY_1 may be provided to the encryption module 456 based on the first write address to perform the encryption operation.

In step S223a, the storage controller 400 may read and receive the first data DAT1 from the namespace 322 based on the first read address (step S223a1). The security module 450 (e.g., the encryption module 456) may generate the encrypted first data EDAT1 by encrypting the first data DAT1 using the first key KY_1 (step S223a2). The storage controller 400 may transmit the encrypted first data EDAT1 to the buffer memory 330 based on the first write address, and the encrypted first data EDAT1 may be stored in the first memory region MR_1 (step S223a3).

After such operations based on the first request RI_REQ are successfully completed, the storage controller 400 may transmit a first success response RI_RSP to the host device 200.

Figure 15:
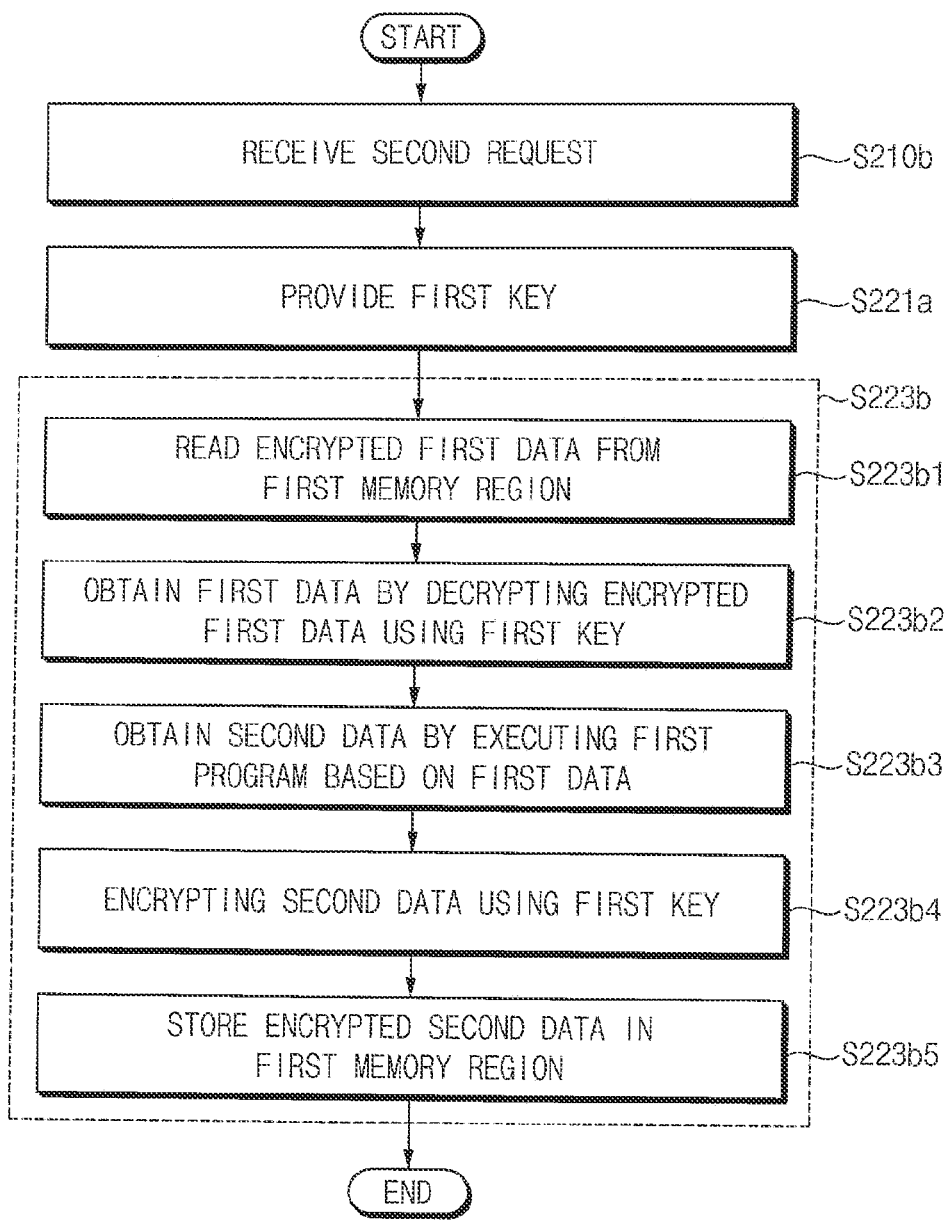
FIG. 15 is a flowchart illustrating another example of receiving a program execution request and performing a program execution operation in FIG. 2.
Figure 16:
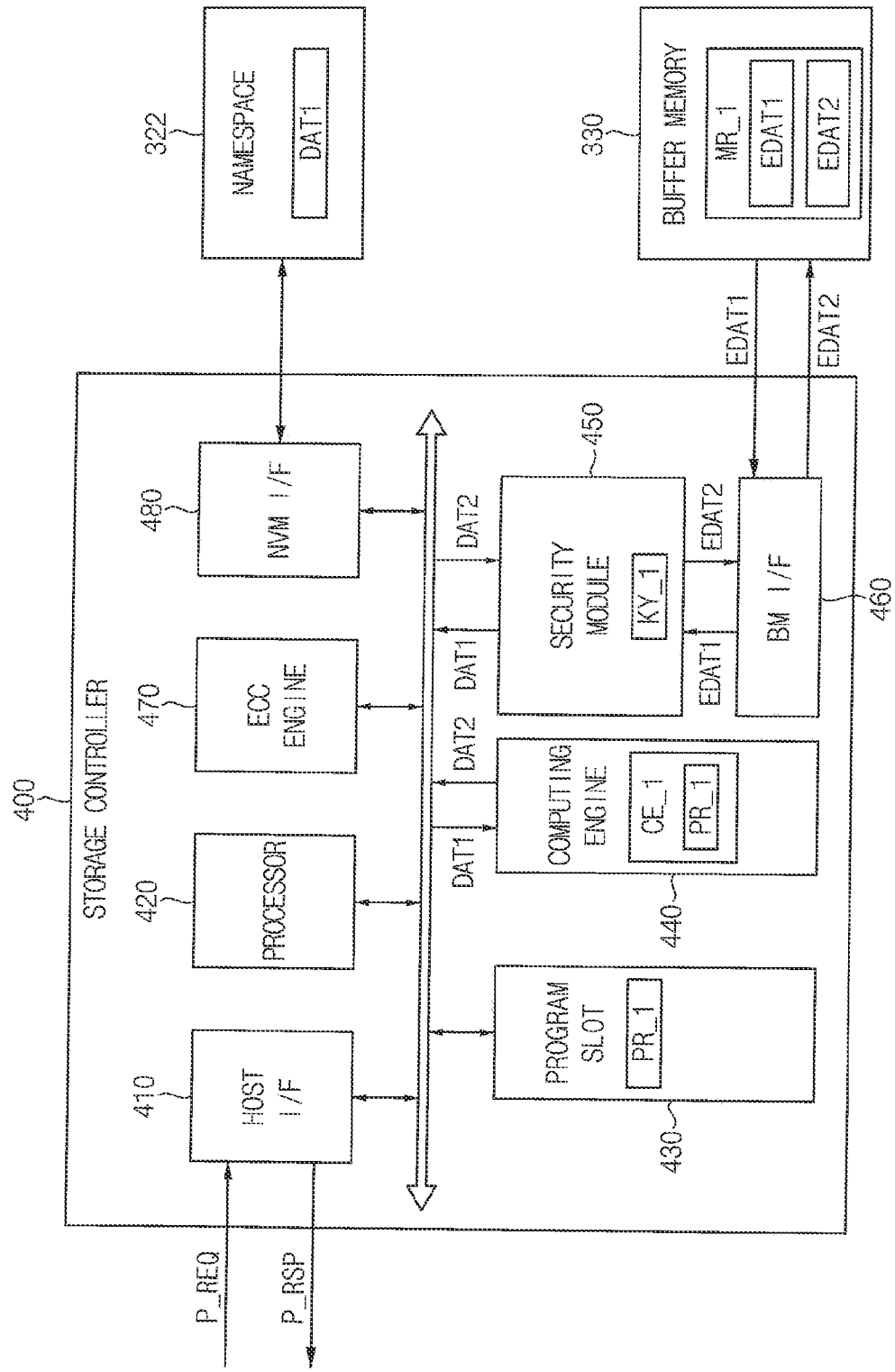
FIG. 16 is a diagram for describing an operation of FIG. 15.

FIG. 15 is a flowchart illustrating another example of receiving a program execution request and performing a program execution operation in FIG. 2. FIG. 16 is a diagram for describing an operation of FIG. 15.

Referring to FIGS. 2, 12, 15 and 16, in step S210, a second request P_REQ, which is included in the program execution request PE_REQ and included in the access request to the first memory region MR_1, may be further received (step S210b). For example, the second request P_REQ may be a request for executing the first program PR_1 based on the first data DAT1 and for storing second data DAT2, which is a result of executing the first program PR_1, in the first memory region MR_1. For example, the second request P_REQ may include the first program ID that is required to execute the first program PR_1, a second read address that is required to read the encrypted first data EDAT1 corresponding to the first data DAT1 from the first memory region MR_1, a second write address that is required to write encrypted second data EDAT2 corresponding to the second data DAT2 to the first memory region MR_1, or the like.

In step S220, the key memory 454 may provide the first key KY_1 based on the second request P_REQ (step S221b), and a decryption operation on the first data DAT1 and an encryption operation on the second data DAT2 may be further performed using the first key KY_1 (step S223b). For example, the first key KY_1 may be provided to the decryption module 458 and the encryption module 456 based on the second read address and the second write address to perform the decryption operation and the encryption operation.

In step S223b, the storage controller 400 may read the encrypted first data EDAT1 from the first memory region MR_1 based on the second read address (step S223b1). The security module 450 (e.g., the decryption module 458) may obtain the first data DAT1 by decrypting the encrypted first data EDAT1 using the first key KY_1 (step S223b2). The first computing engine CE_1 may obtain the second data DAT2 by executing the first program PR_1 based on the first data DAT1 (step S223b3). For example, when the first program PR_1 is a filtering program, the second data DAT2 may be generated by filtering the first data DAT1 depending on a predetermined criterion. The security module 450 (e.g., the encryption module 456) may generate the encrypted second data EDAT2 by encrypting the second data DAT2 using the first key KY_1 (step S223b4). The storage controller 400 may transmit the encrypted second data EDAT2 to the buffer memory 330 based on the second write address, and the encrypted second data EDAT2 may be stored in the first memory region MR_1 (step S223b5).

After such operations based on the second request P_REQ are successfully completed, the storage controller 400 may transmit a second success response P_RSP to the host device 200.

Figure 17:
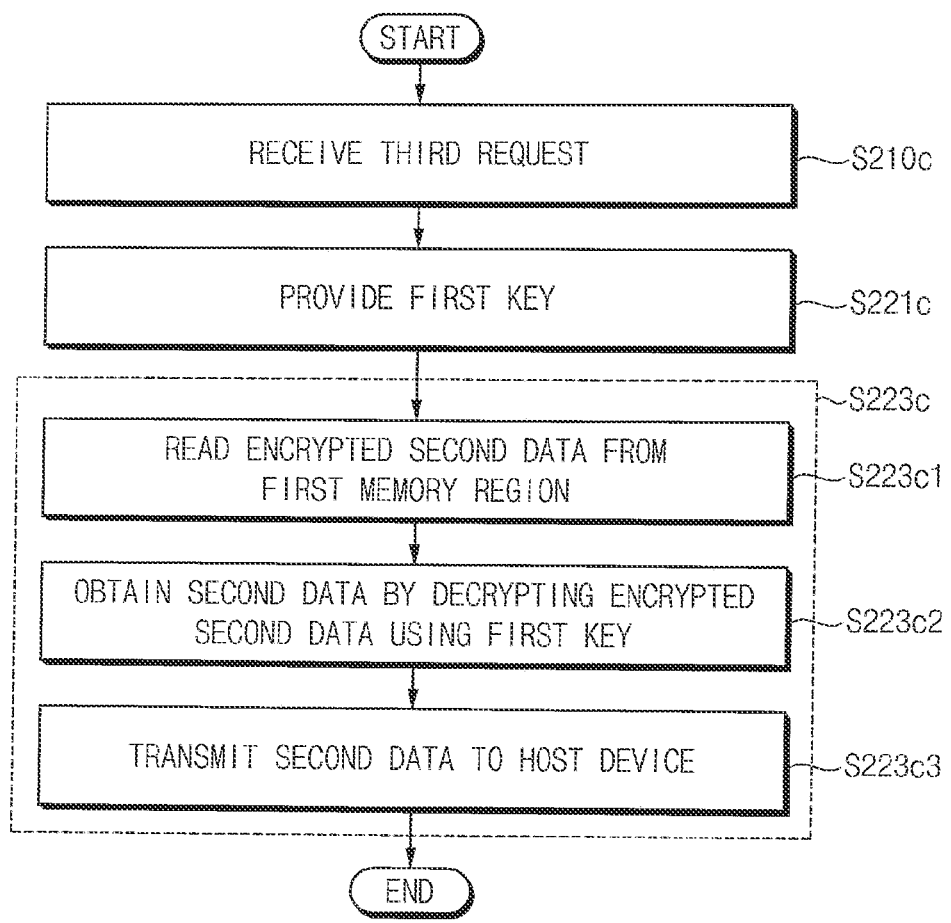
FIG. 17 is a flowchart illustrating still another example of receiving a program execution request and performing a program execution operation in FIG. 2.
Figure 18:
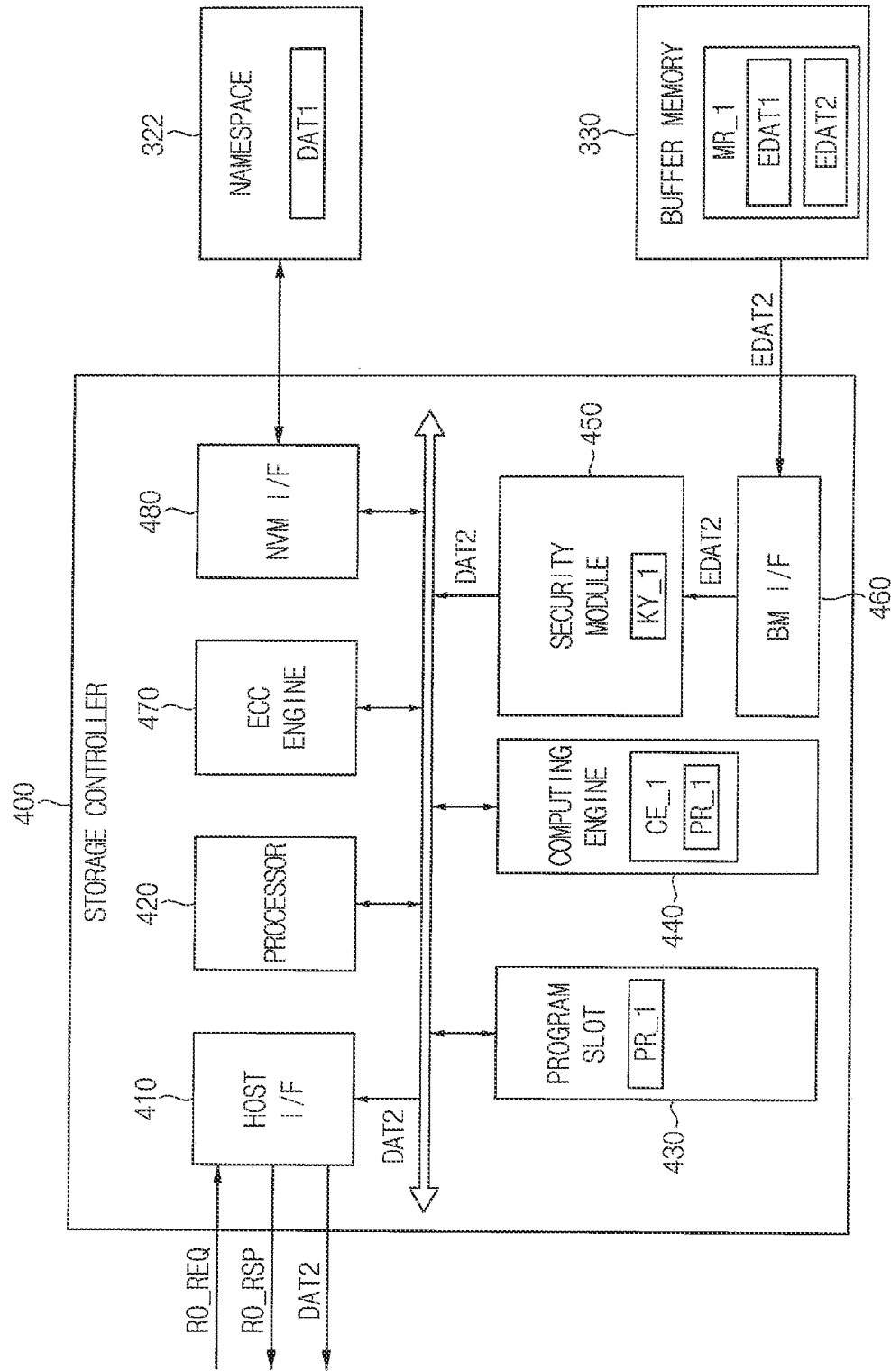
FIG. 18 is a diagram for describing an operation of FIG. 17.

FIG. 17 is a flowchart illustrating still another example of receiving a program execution request and performing a program execution operation in FIG. 2. FIG. 18 is a diagram for describing an operation of FIG. 17.

Referring to FIGS. 2, 12, 17 and 18, in step S210 a third request RO_REQ, which is included in the program execution request PE_REQ and included in the access request to the first memory region MR_1, may be further received (step S210c). For example, the third request RO_REQ may be a request for transmitting the second data DAT2 to the host device 200. The third request RO_REQ may be referred to as an output data (or result data) read request. For example, the third request RO_REQ may include a third read address that is required to read the encrypted second data EDAT2 corresponding to the second data DAT2 from the first memory region MR_1, or the like.

In step S220, the key memory 454 may provide the first key KY_1 based on the third request RO_REQ (step S221c) and a decryption operation on the second data DAT2 may be further performed using the first key KY_1 (step S223c). For example, the first key KY_1 may be provided to the decryption module 458 based on the third read address to perform the decryption operation.

In step S223c, the storage controller 400 may read the encrypted second data EDAT2 from the first memory region MR_1 based on the third read address (step S223c1). The security module 450 (e.g., the decryption module 458) may obtain the second data DAT2 by decrypting the encrypted second data EDAT2 using the first key KY_1 (step S223c2). The storage controller 400 may transmit the second data DAT2 to the host device 200 (step S223c3).

After such operations, based on the third request RO_REQ, are successfully completed, the storage controller 400 may transmit a third success response RO_RSP to the host device 200.

Figure 19:
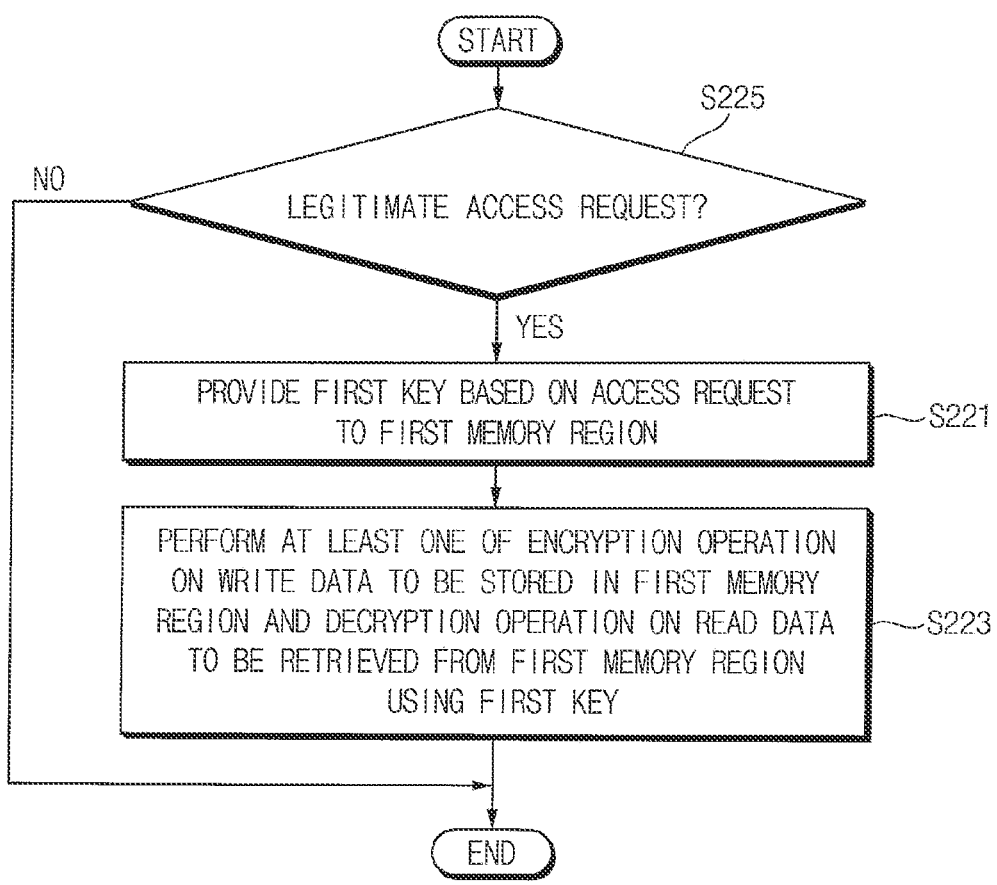
FIG. 19 is a flowchart illustrating another example of performing a program execution operation in FIG. 2.

FIG. 19 is a flowchart illustrating another example of performing a program execution operation in FIG. 2. The descriptions repeated with FIG. 12 will be omitted.

Referring to FIGS. 2 and 19, in step S220 it may be checked or determined whether the access request to the first memory region MR_1 is a legitimate or authorized access request (step S225). Steps S221 and S223 may be performed only when the access request to the first memory region MR_1 is the legitimate access request (step S225: YES). The process may be terminated without performing steps S221 and S223 when the access request to the first memory region MR_1 is not the legitimate access request (step S225: NO). The security performance may be improved or enhanced by performing a verification operation to check whether the access request is the legitimate access request (e.g., whether it is a request from a legitimate user).

Figure 20:
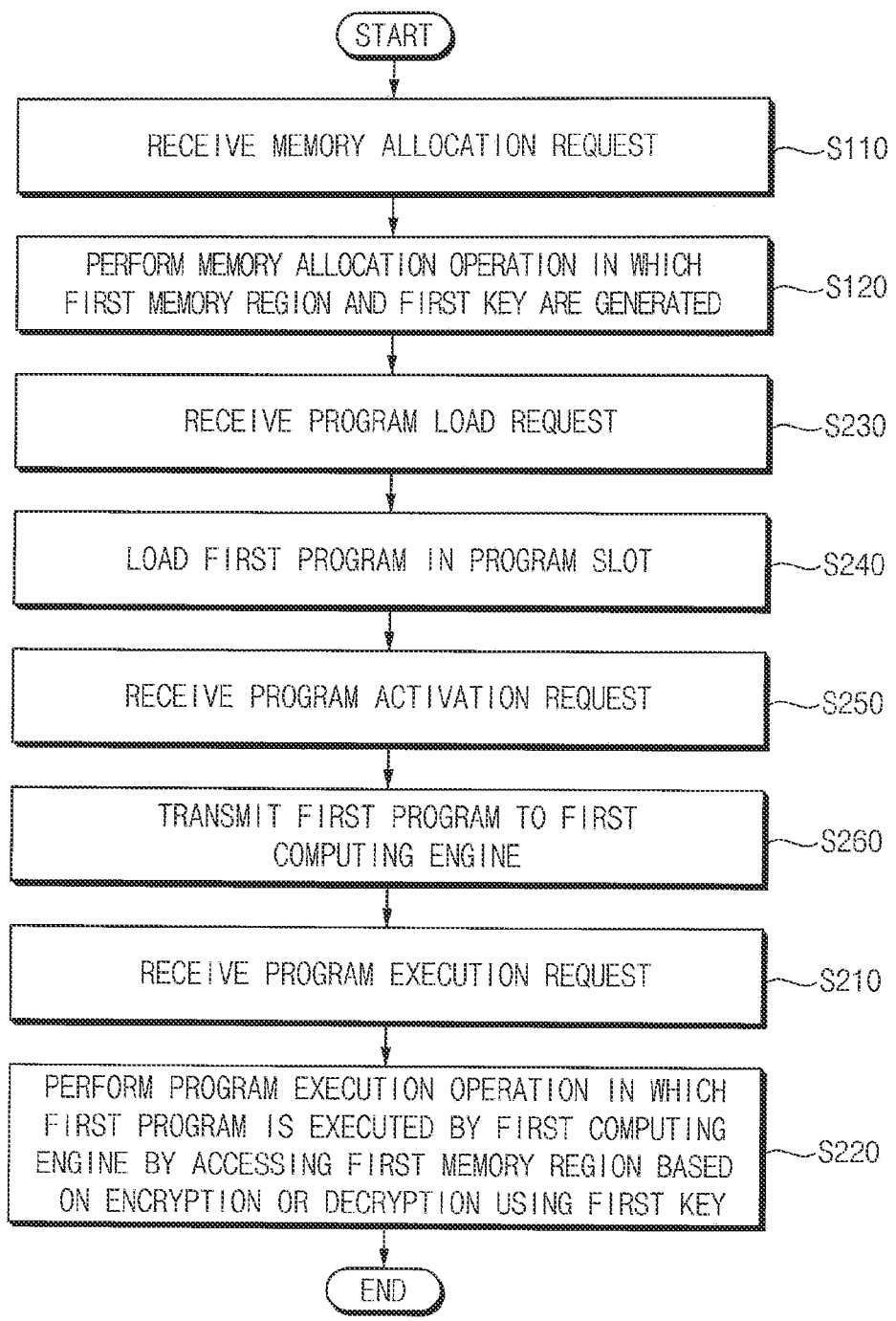
FIG. 20 is a flowchart illustrating another example of a method of allocating and protecting a memory in a computational storage device of FIG. 1.
Figure 21A:
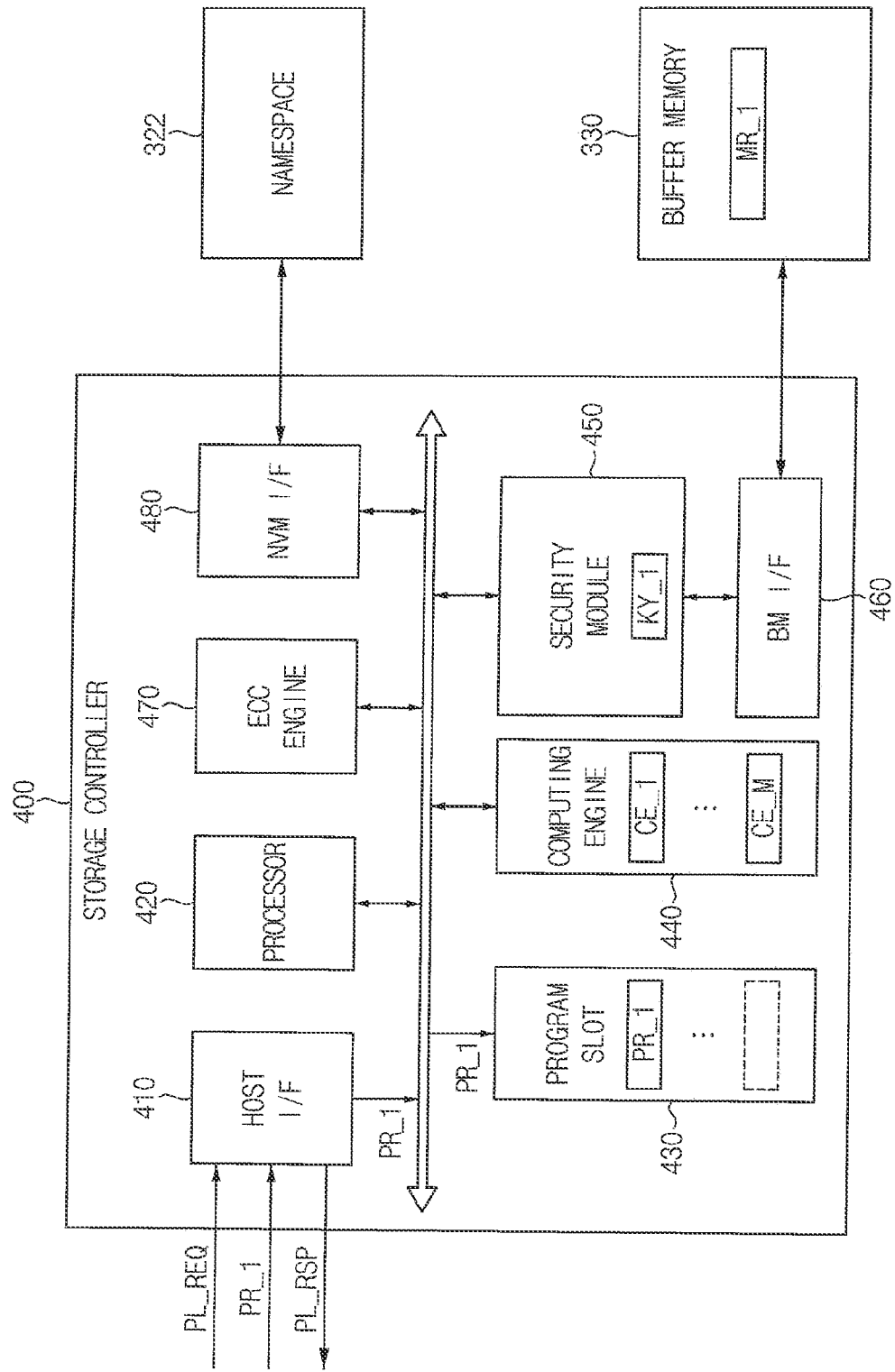
FIGS. 21A and 21B are diagrams for describing an operation of FIG. 20.
Figure 21B:
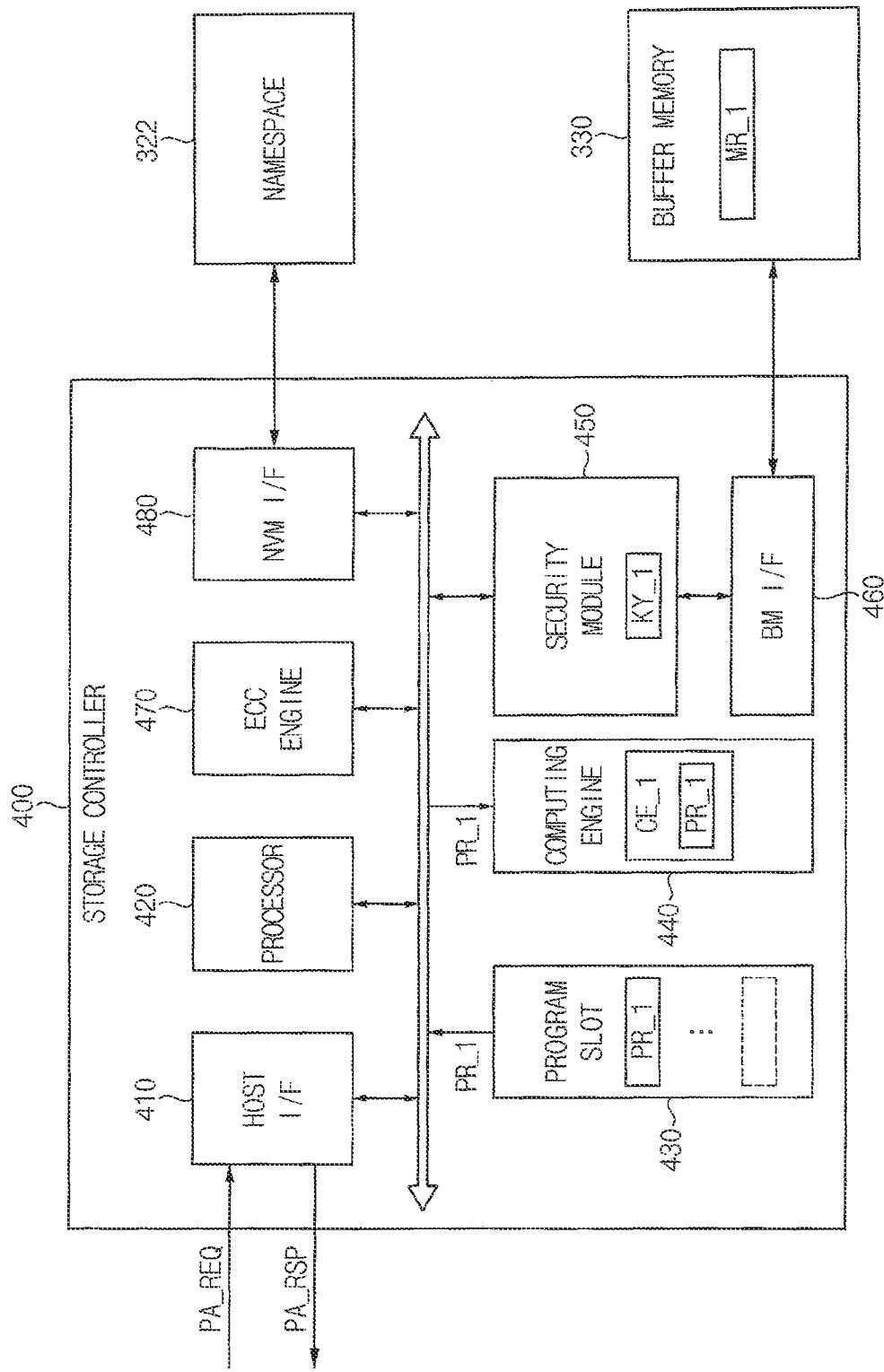

FIG. 20 is a flowchart illustrating another example of a method of allocating and protecting a memory in a computational storage device of FIG. 1. FIGS. 21A and 21B are diagrams for describing an operation of FIG. 20. The descriptions repeated with FIG. 2 will be omitted.

Referring to FIGS. 1, 20, 21A and 21B, in step S200, before steps S210 and S220 are performed, the storage controller 400 may receive a program load request PL_REQ from the host device 200 (step S230) and may receive the first program PR_1 corresponding to the program load request PL_REQ. For example, the program load request PL_REQ may include the first program ID associated with the first program PR_1. The storage controller 400 may load the first program PR_1 into the program slot 430 based on the program load request PL_REQ (step S240). After the program load operation is successfully completed, the storage controller 400 may transmit a program load success response PL_RSP to the host device 200.

After that, the storage controller 400 may receive a program activation request PA_REQ from the host device 200 (step S250). For example, the program activation request PA_REQ may include the first program ID associated with the first program PR_1 and information associated with the first computing engine CE_1 to execute the first program PR_1. The storage controller 400 may transmit the first program PR_1 to the first computing engine CE_1 based on the program activation request PA_REQ (step S260), and then the execution of the first program PR_1 may be prepared. After the program activation operation is successfully completed, the storage controller 400 may transmit a program activation success response PA_RSP to the host device 200.

Figure 22:
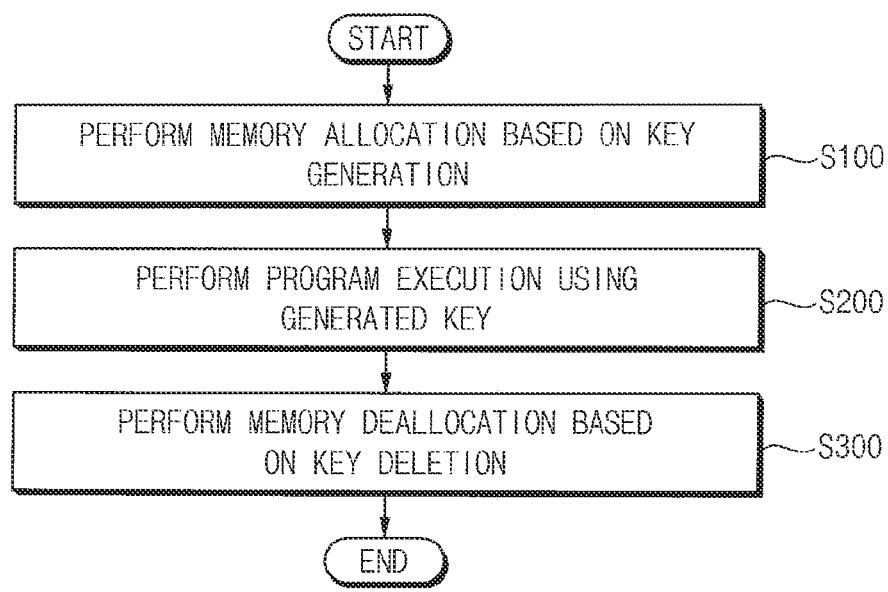
FIG. 22 is a flowchart illustrating a method of allocating and protecting a memory in a computational storage device according to example embodiments.

FIG. 22 is a flowchart illustrating a method of allocating and protecting a memory in a computational storage device according to example embodiments. The descriptions repeated with FIG. 1 will be omitted.

Referring to FIG. 22, in a method of allocating and protecting a memory in a computational storage device according to example embodiments, after steps S100 and S200 are performed, a memory deallocation based on key deletion is performed (step S300). For example, the memory deallocation may be performed on or for the buffer memory and the key that is used to access the buffer memory may be deleted or removed while the memory deallocation is performed.

Figure 23:
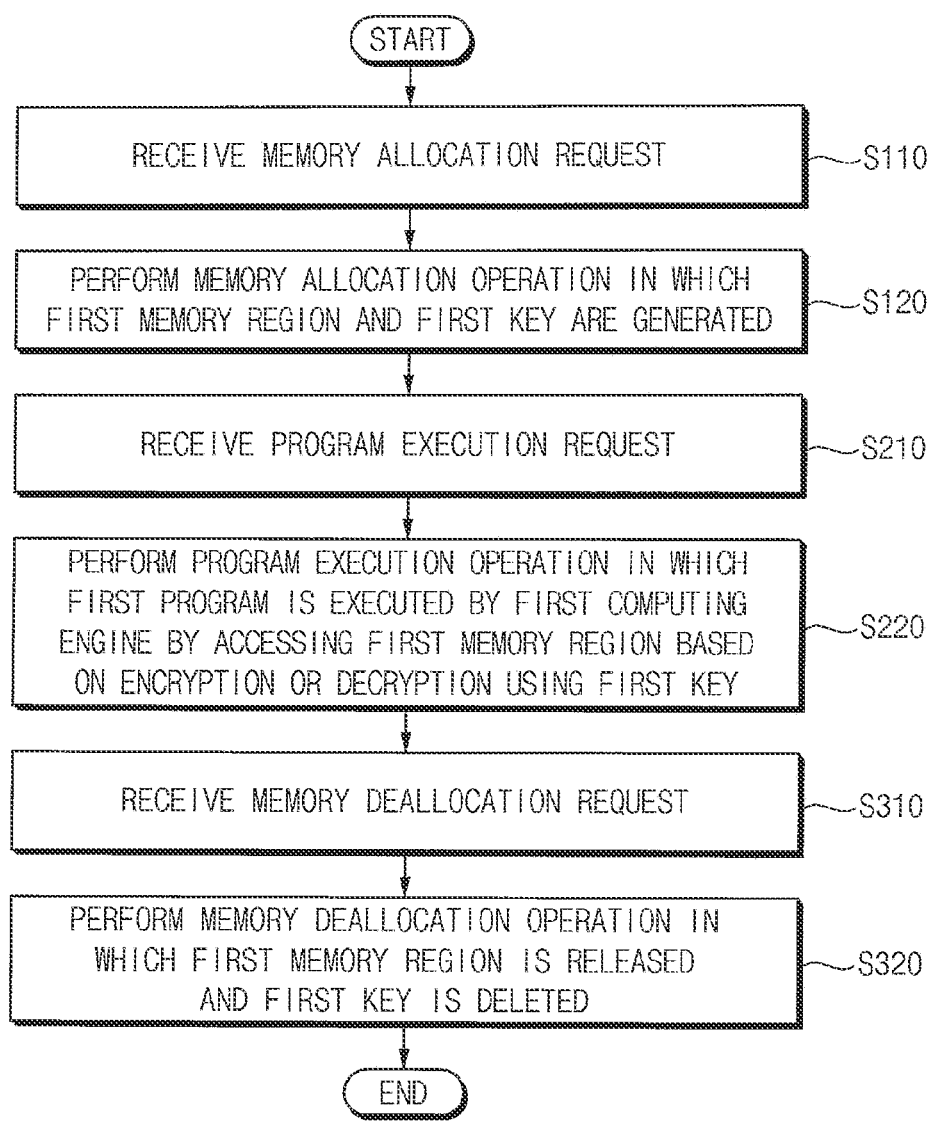
FIG. 23 is a flowchart illustrating an example of a method of allocating and protecting a memory in a computational storage device of FIG. 22.
Figure 24A:
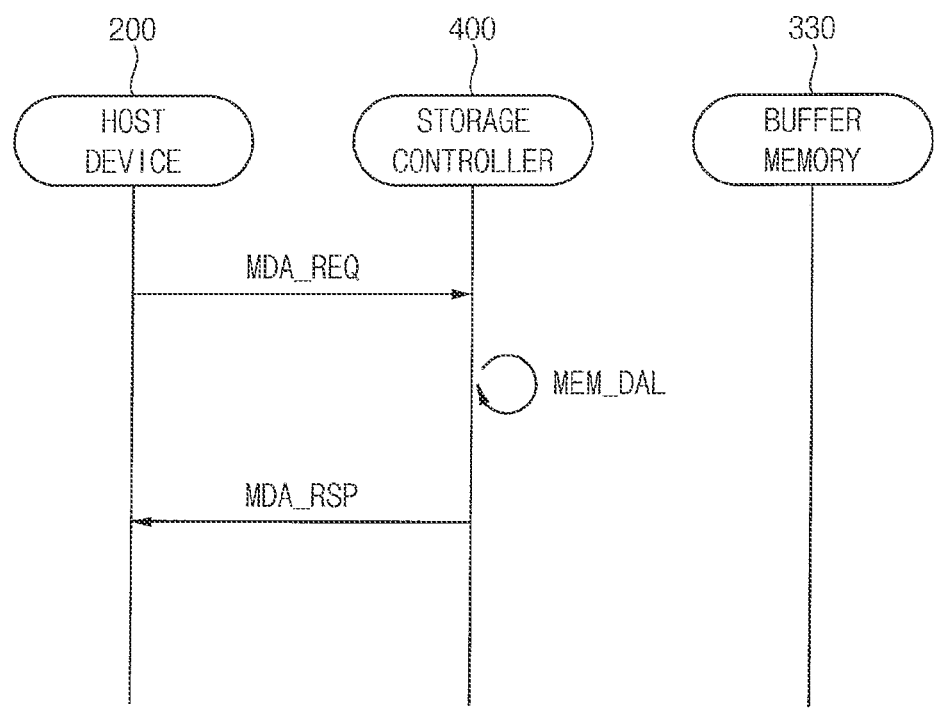
FIGS. 24A and 24B are diagrams for describing an operation of FIG. 23.
Figure 24B:
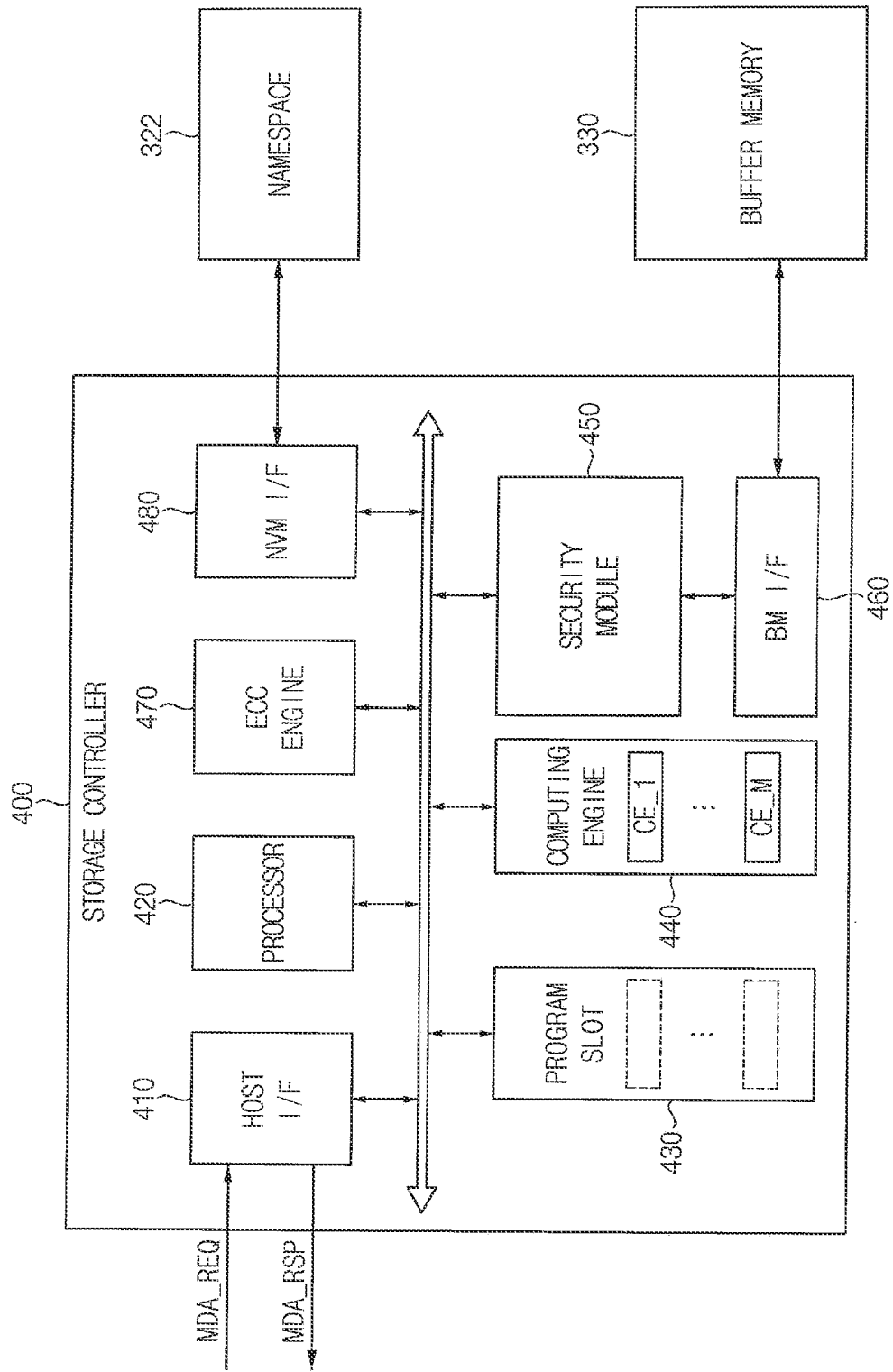

FIG. 23 is a flowchart illustrating an example of a method of allocating and protecting a memory in a computational storage device of FIG. 22. FIGS. 24A and 24B are diagrams for describing an operation of FIG. 23. The descriptions repeated with FIG. 2 will be omitted.

Referring to FIGS. 22, 23, 24A and 24B, in step S300, the storage controller 400 receives a memory deallocation request MDA_REQ from the host device 200 (step S310). For example, the memory deallocation request MDA_REQ may include the first memory region ID MR_ID_1 associated with the first memory region MR_1. Based on the memory deallocation request MDA_REQ, the storage controller 400 performs a memory deallocation operation MEM_DAL in which the first memory region MR_1 is released in the buffer memory 330 and the first key KY_1 is deleted (step S320). For example, an operation of deleting the first key KY_1 may be performed by the security module 450 included in the storage controller 400. After the memory deallocation operation MEM_DAL is successfully completed, the storage controller 400 may transmit a deallocation success response MDA RSP to the host device 200.

Figure 25:
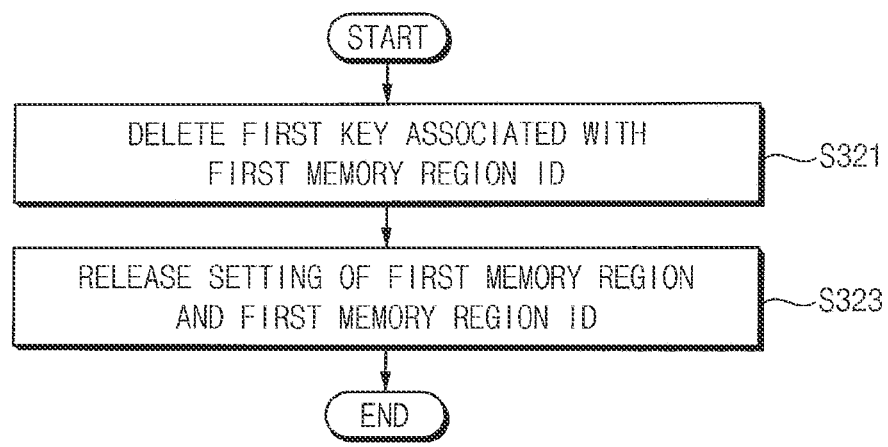
FIG. 25 is a flowchart illustrating an example of performing a memory deallocation operation in FIG. 23.

FIG. 25 is a flowchart illustrating an example of performing a memory deallocation operation in FIG. 23.

Referring to FIGS. 10, 23 and 25, in step S320, the first key KY_1 associated with the first memory region ID MR_ID_1 corresponding to the first memory region MR_1 may be deleted (step S321). For example, the relationship among the first memory region ID MR_ID_1, the first key KY_1, and the first address information ADDR_1 stored in the key memory 454 may be deleted. The settings of the first memory region MR_1 and the first memory region ID MR_ID_1 in the buffer memory 330 may be released (step S323).

Figure 26:
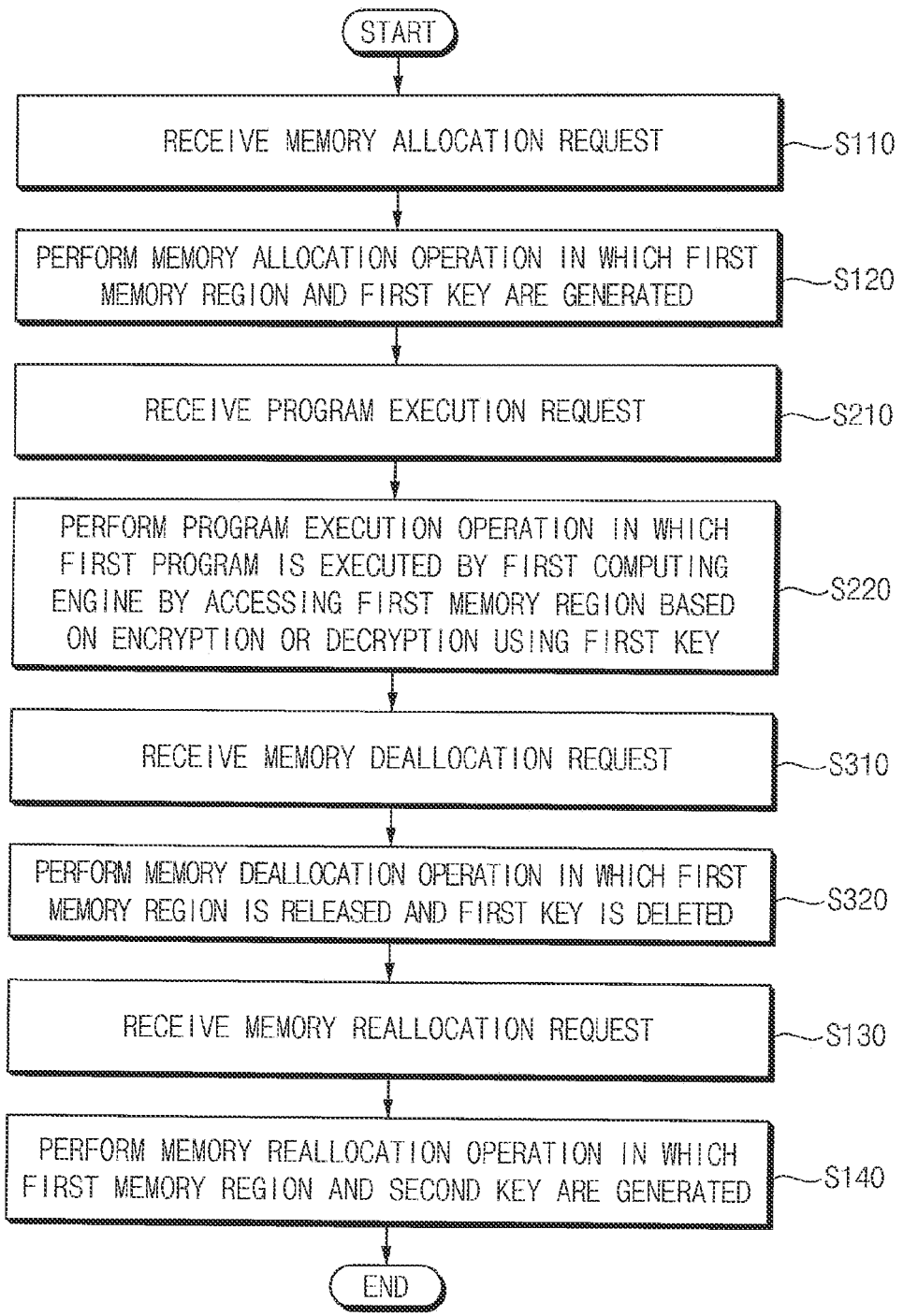
FIG. 26 is a flowchart illustrating another example of a method of allocating and protecting a memory in a computational storage device of FIG. 22.
Figure 27A:
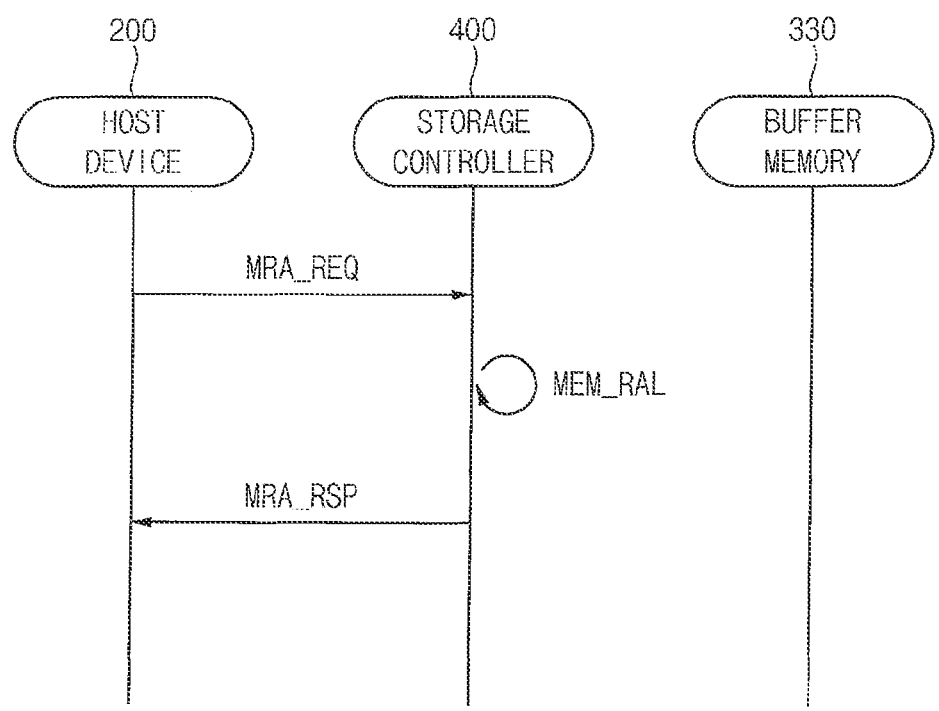
FIGS. 27A and 27B are diagrams for describing an operation of FIG. 26.
Figure 27B:
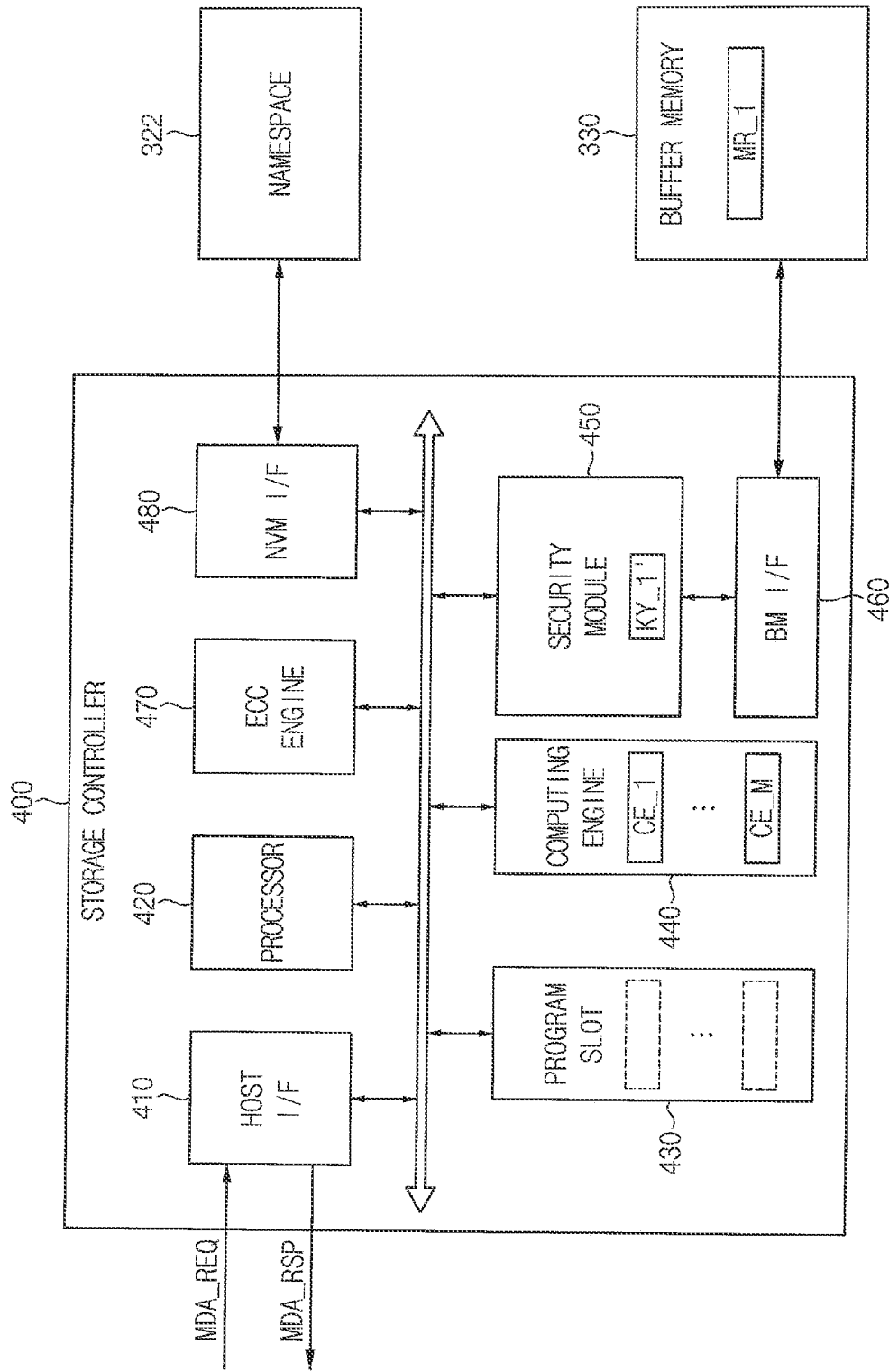

FIG. 26 is a flowchart illustrating another example of a method of allocating and protecting a memory in a computational storage device of FIG. 22. FIGS. 27A and 27B are diagrams for describing an operation of FIG. 26. The descriptions repeated with FIG. 23 will be omitted.

Referring to FIGS. 22, 26, 27A and 27B, after steps S310 and S320 are performed, in step S100, the storage controller 400 may receive a memory reallocation request MRA_REQ from the host device 200 (step S130). For example, step S130 may be similar to step S110 and the memory reallocation request MRA_REQ may include the first address information ADDR_1 associated with the first memory region MR_1. Based on the memory reallocation request MRA_REQ, the storage controller 400 may perform a memory reallocation operation MEM_RAL in which the first memory region MR_1 is generated in the buffer memory 330 and a second key KY_1' associated with the first memory region MR_1 is generated. For example, step S140 may be similar to step S120 and the second key KY_1' may be different from the first key KY_1. After the memory reallocation operation MEM_RAL is successfully completed, the storage controller 400 may transmit a reallocation success response MRA_RSP to the host device 200. For example, the memory reallocation request MRA_REQ may be substantially the same as the memory allocation request MA_REQ in FIG. 8A.

As described above, when the memory allocation operation MEM_AL, the memory deallocation operation MEM_DAL, and the memory reallocation operation MEM_RAL are sequentially performed on the same first memory region MR_1, the first key KY_1 generated by the memory allocation operation MEM_AL may be different from the second key KY_1' generated by the memory reallocation operation MEM_RAL. Therefore, even when the same data is to be stored, data encrypted using the first key KY_1 to be stored in the first memory region MR_1 after performing the memory allocation operation MEM_AL may be different from data encrypted using the second key KY_1' to be stored in the first memory region MR_1 after the memory reallocation operation MEM_RAL is performed.

In the computational storage device according to example embodiments, the security module 450 may be added or disposed on a path in the storage controller 400 for accessing the buffer memory 330, the key corresponding to the memory region may be generated when the memory region is allocated, the data may be encrypted and/or decrypted using the key corresponding to the address when the memory region is accessed, the key corresponding to the memory region may be deleted when the memory region is deallocated, and the new key different from the previous key may be generated when the memory region is reallocated. As such, the data previously stored in the specific memory region may not be identified when deallocating and reallocating the memory region. Accordingly, the data leakage may be prevented and the security performance may be improved.

Figure 28:
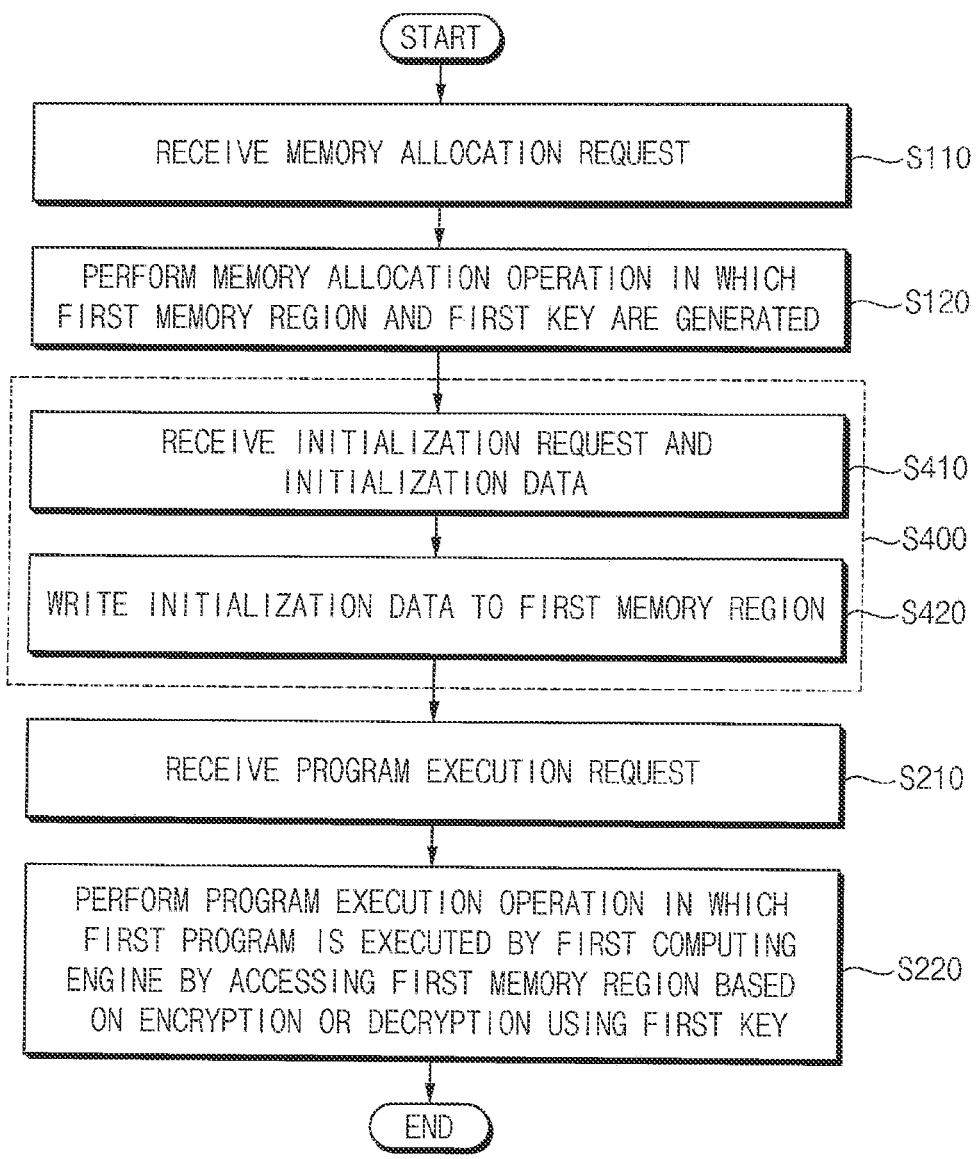
FIG. 28 is a flowchart illustrating still another example of a method of allocating and protecting a memory in a computational storage device of FIG. 1.

FIG. 28 is a flowchart illustrating still another example of a method of allocating and protecting a memory in a computational storage device of FIG. 1. The descriptions repeated with FIG. 2 will be omitted.

Referring to FIGS. 1 and 28, between steps S100 and S200, the storage controller 400 may perform an initialization operation on the first memory region MR_1. For example, the storage controller 400 may receive an initialization request and initialization data from the host device 200 (step S410) and may write the initialization data to the first memory region MR_1 (step S420). For example, the initialization data may include a specific pattern such as a '0' pattern.

In some example embodiments, steps S230, S240, S250 and S260 in FIG. 20 may be additionally performed in examples of FIGS. 23, 26 and 28. In some example embodiments, steps S310 and S320 in FIG. 23 may be additionally performed in examples of FIGS. 20 and 28. In some example embodiments, steps S410 and S420 in FIG. 28 may be additionally performed in examples of FIGS. 20, 23 and 26.

Figure 29:
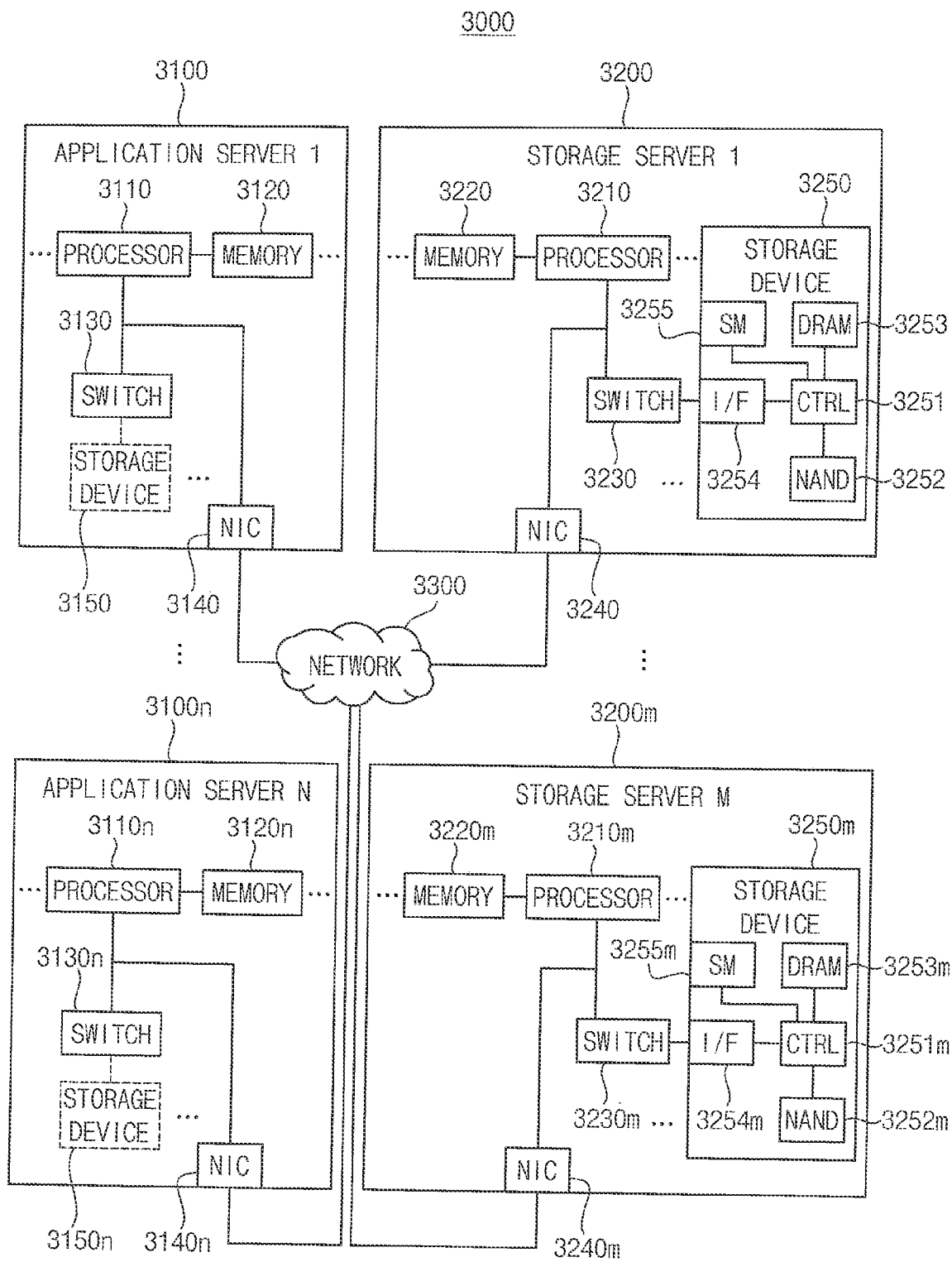
FIG. 29 is a block diagram illustrating a data center including a storage device according to example embodiments.

FIG. 29 is a block diagram illustrating a data center including a storage device according to example embodiments.

Referring to FIG. 29, a data center 3000 may be a facility that collects various types of data and provides various services and may be referred to as a data storage center. The data center 3000 may be a system for operating search engines and databases and may be a computing system used by companies such as banks or government agencies. The data center 3000 may include application servers 3100 to 3100*n* and storage servers 3200 to 3200*m*. The number of the application servers 3100 to 3100*n* and the number of the storage servers 3200 to 3200*m* may be variously selected according to example embodiments, and the number of the application servers 3100 to 3100*n* and the number of the storage servers 3200 to 3200*m* may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200 and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100*n* and the storage servers 3200 to 3200*m* may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200*m* may be provided as file storages, block storages, or object storages according to an access scheme of the network 3300.

In some example embodiments, the network 3300 may be a storage-only network or a network dedicated to storage, such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general or normal network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100*n*, and the description of the storage server 3200 may be applied to the other storage server 3200*m*.

The application server 3100 may store data requested to be stored by a user or a client into one of the storage servers 3200 to 3200*m* through the network 3300. In addition, the application server 3100 may obtain data requested to be read by the user or the client from one of the storage servers 3200 to 3200*m* through the network 3300. For example, the application server 3100 may be implemented as a web server or a database management system (DBMS).

The application server 3100 may access a memory 3120*n* or a storage device 3150*n* included in the other application server 3100*n* through the network 3300 and/or may access the memories 3220 to 3220*m* or the storage devices 3250 to 3250*m* included in the storage servers 3200 to 3200*m* through the network 3300. Thus, the application server 3100 may perform various operations on data stored in the application servers 3100 to 3100*n* and/or the storage servers 3200 to 3200*m*. For example, the application server 3100 may execute a command for moving or copying data between the application servers 3100 to 3100*n* and/or the storage servers 3200 to 3200*m*. The data may be transferred from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. For example, the data transferred through the network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA), an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200m and/or the application servers 3100 to 3100n, the processor may transmit a command to the storage devices 3150 to 3150n and 3250 to 3250m or the memories 3120 to 3120n and 3220 to 3220m to program or read data. For example, the data may be error-corrected data corrected by an error correction code (ECC) engine. For example, the data may be processed by a data bus inversion (DBI) or a data masking (DM) and may include cyclic redundancy code (CRC) information. For example, the data may be encrypted data for security or privacy.

The storage devices 3150 to 3150m and 3250 to 3250m may transmit a control signal and command/address signals to NAND flash memory devices 3252 to 3252m in response to a read command received from the processor. When data is read from the NAND flash memory devices 3252 to 3252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command or may read data from the NAND flash memory device 3252 in response to a read command. For example, the write command and/or the read command may be provided from the processor 3210 in the storage server 3200, the processor 3210m in the other storage server 3200m, or the processors 3110 to 3110n in the application servers 3100 to 3100n. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

The storage devices 3250 to 3250m may be the computational storage devices according to example embodiments, may include security modules 3255 to 3255m, and may perform the method of allocating and protecting the memory according to example embodiments.

The disclosure may be applied to various electronic devices and systems that include the computational storage devices. For example, the disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of allocating and protecting a memory in a computational storage device including a first computing engine and a buffer memory, the method comprising:
   receiving a memory allocation request from a host device that is disposed outside the computational storage device;
   based on the memory allocation request, performing a memory allocation operation in which a first memory region is generated in the buffer memory and a first key associated with the first memory region is generated;
   receiving a program execution request from the host device; and
   based on the program execution request, performing a program execution operation in which a first program is executed by the first computing engine by accessing the first memory region based on an encryption or a decryption using the first key,
   wherein performing the program execution operation includes performing at least one of an encryption operation on write data to be stored in the first memory region and a decryption operation on read data to be retrieved from the first memory region using the first key, and
   wherein performing at least one of the encryption operation and the decryption operation includes:
      reading encrypted first data from the first memory region;
      obtaining the first data by decrypting the encrypted first data using the first key;
      obtaining second data by executing the first program based on the first data;

encrypting the second data using the first key to generate encrypted second data; and storing the encrypted second data in the first memory region.

2. The method of claim 1, wherein performing the memory allocation operation includes:

setting the first memory region on a part of the buffer memory and a first memory region identification (ID) corresponding to the first memory region;

generating the first key associated with the first memory region ID; and storing the first memory region ID and the first key.

3. The method of claim 2, wherein after the memory allocation operation is successfully completed, the computational storage device is configured to transmit an allocation success response to the host device.

4. The method of claim 3, wherein after the memory allocation request is received, the computational storage device is configured to transmit an allocation success response to the host device without receiving an additional data write request and additional write data from the host device.

5. The method of claim 1, wherein performing the program execution operation includes:

providing the first key based on an access request to the first memory region.

6. The method of claim 5, wherein:

the access request to the first memory region includes a first request for storing the first data, which is a target of executing the first program, in the first memory region, and performing at least one of the encryption operation and the decryption operation includes:

encrypting the first data using the first key to generate the encrypted first data; and storing the encrypted first data in the first memory region.

7. The method of claim 6, wherein the access request to the first memory region further includes a second request for executing the first program based on the first data and for storing the second data, which is a result of executing the first program, in the first memory region.

8. The method of claim 7, wherein:

the access request to the first memory region further includes a third request for transmitting the second data to the host device, and performing at least one of the encryption operation and the decryption operation further includes:

reading the encrypted second data from the first memory region;

obtaining the second data by decrypting the encrypted second data using the first key; and transmitting the second data to the host device.

9. The method of claim 5, wherein:

performing the program execution operation further includes checking whether the access request to the first memory region is a legitimate access request, and only in response to the access request to the first memory region being the legitimate access request, the computational storage device is configured to provide the first key.

10. The method of claim 1, further comprising:

receiving a program load request from the host device; and based on the program load request, loading the first program in a program slot.

11. The method of claim 10, further comprising:

receiving a program activation request from the host device; and based on the program activation request, transmitting the first program to the first computing engine.

12. The method of claim 1, further comprising:

receiving a memory deallocation request from the host device; and based on the memory deallocation request, performing a memory deallocation operation in which the first memory region is released in the buffer memory and the first key is deleted.

13. The method of claim 12, wherein performing the memory deallocation operation includes:

deleting the first key associated with a first memory region ID corresponding to the first memory region, and releasing a setting of the first memory region and the first memory region ID.

14. The method of claim 12, further comprising:

receiving a memory reallocation request from the host device; and based on the memory reallocation request, performing a memory reallocation operation in which the first memory region is generated in the buffer memory and a second key associated with the first memory region is generated.

15. The method of claim 14, wherein:

the second key is different from the first key, and second data is encrypted using the second key after performing the memory deallocation operation and the memory reallocation operation and is different from first data encrypted using the first key after performing the memory allocation operation.

16. The method of claim 1, further comprising performing an initialization operation on the first memory region.

17. The method of claim 16, wherein performing the initialization operation includes:

receiving an initialization request and initialization data from the host device, and writing the initialization data to the first memory region.

18. A computational storage device comprising:

a plurality of nonvolatile memories;

a buffer memory configured to temporarily store data that is stored in or to be stored in the plurality of nonvolatile memories, the buffer memory being used to perform a data processing function; and a storage controller configured to control an operation of the plurality of nonvolatile memories and an operation of the buffer memory, wherein:

the storage controller includes:

a first computing engine used to perform the data processing function; and a security module used to access the buffer memory, and the storage controller is configured to:

receive a memory allocation request from a host device that is disposed outside the computational storage device;

based on the memory allocation request, perform a memory allocation operation in which a first memory region is generated in the buffer memory and a first key associated with the first memory region is generated;

receive a program execution request from the host device; and based on the program execution request, perform a program execution operation in which a first program is executed by the first computing engine by accessing the first memory region based on an encryption or a decryption using the first key, wherein performing the program execution operation includes performing at least one of an encryption operation on write data to be stored in the first memory region and a decryption operation on read data to be retrieved from the first memory region using the first key, and wherein performing at least one of the encryption operation and the decryption operation includes:
  reading encrypted first data from the first memory region;
  obtaining the first data by decrypting the encrypted first data using the first key;
  obtaining second data by executing the first program based on the first data;
  encrypting the second data using the first key to generate encrypted second data; and
  storing the encrypted second data in the first memory region.

19. The computational storage device of claim 18, wherein the security module includes:
  a key generator configured to generate the first key associated with a first memory region identification (ID) corresponding to the first memory region;
  a key memory configured to store the first memory region ID and the first key;
  an encryption module configured to perform the encryption operation using the first key; and
  a decryption module configured to perform the decryption operation using the first key.

20. A method of operating a storage system including a host device and a computational storage device, the computational storage device including a storage controller and a buffer memory, the storage controller performing a data processing function, the method comprising:
  transmitting, by the host device, a memory allocation request to the storage controller;
  based on the memory allocation request, performing, by the storage controller, a memory allocation operation in which a first memory region is generated in the buffer memory and a first key associated with the first memory region is generated;
  transmitting, by the host device, a program load request to the storage controller;
  based on the program load request, loading by the storage controller a first program in a program slot;
  transmitting by the host device a program activation request to the storage controller;
  based on the program activation request, transmitting by the storage controller the first program from the program slot to a first computing engine;
  transmitting by the host device a program execution request to the storage controller;
  based on the program execution request, performing by the storage controller a program execution operation in which the first program is executed by the first computing engine by accessing the first memory region based on an encryption or a decryption using the first key;
  transmitting by the host device a memory deallocation request to the storage controller; and
  based on the memory deallocation request, performing by the storage controller a memory deallocation operation in which the first memory region is released in the buffer memory and the first key is deleted, wherein:
performing the program execution operation includes:
  encrypting first data, which is a target of executing the first program, using the first key to generate encrypted first data;
  storing the encrypted first data in the first memory region;
  reading the encrypted first data from the first memory region;
  obtaining the first data by decrypting the encrypted first data using the first key;
  obtaining second data, which is a result of executing the first program, by executing the first program based on the first data;
  encrypting the second data using the first key to generate encrypted second data;
  storing the encrypted second data in the first memory region;
  reading the encrypted second data from the first memory region;
  obtaining the second data by decrypting the encrypted second data using the first key; and
  transmitting, by the storage controller, the second data to the host device.

* * * * *